(12) United States Patent
Ou et al.

(10) Patent No.: US 12,499,910 B2
(45) Date of Patent: Dec. 16, 2025

(54) SUBTITLE EDITING METHOD AND APPARATUS, AND ELECTRONIC DEVICE

(71) Applicant: DOUYIN VISION CO., LTD, Beijing (CN)

(72) Inventors: Tongtong Ou, Beijing (CN); Jiahao Huang, Beijing (CN); Tan Zhang, Beijing (CN); Youfang Xi, Beijing (CN)

(73) Assignee: DOUYIN VISION CO., LTD., Beijing (CN)

( * ) Notice: Subject to any disclaimer, the term of this patent is extended or adjusted under 35 U.S.C. 154(b) by 134 days.

(21) Appl. No.: 18/023,711

(22) PCT Filed: Aug. 25, 2021

(86) PCT No.: PCT/CN2021/114504
§ 371 (c)(1),
(2) Date: Feb. 27, 2023

(87) PCT Pub. No.: WO2022/042593
PCT Pub. Date: Mar. 3, 2022

(65) Prior Publication Data
US 2023/0308730 A1 Sep. 28, 2023

(30) Foreign Application Priority Data
Aug. 25, 2020 (CN) .......................... 202010868161.8

(51) Int. Cl.
*G06F 40/166* (2020.01)
*G11B 27/00* (2006.01)
(Continued)

(52) U.S. Cl.
CPC .......... *G11B 27/031* (2013.01); *G06F 40/166* (2020.01); *G11B 27/00* (2013.01); *G06F 40/131* (2020.01); *G06F 40/169* (2020.01)

(58) Field of Classification Search
CPC .......... H04N 21/4312; H04N 21/8133; H04N 21/43074; H04N 21/4884; G06F 40/166;
(Continued)

(56) References Cited

U.S. PATENT DOCUMENTS

2014/0201631 A1\* 7/2014 Pornprasitsakul ... G11B 27/031
715/716
2017/0040037 A1\* 2/2017 Hunt .......................... G06F 8/73

FOREIGN PATENT DOCUMENTS

CN 101071618 A 11/2007
CN 104104986 A 10/2014
(Continued)

OTHER PUBLICATIONS

International Patent Application No. PCT/CN2021/114504; Int'l Written Opinion and Search Report; dated Nov. 26, 2021; 9 pages.

*Primary Examiner* — Thai Q Tran
*Assistant Examiner* — Nienru Yang
(74) *Attorney, Agent, or Firm* — BakerHostetler

(57) ABSTRACT

Disclosed in embodiments of the present invention are a subtitle editing method and apparatus, and an electronic device. A specific embodiment of the method comprises: displaying a video playing area and a subtitle editing area, wherein the video playing area is used for playing a target video, and the subtitle editing area is used for editing candidate subtitles corresponding to the target video; and jointly displaying a video frame currently displayed in the video playing area and subtitles displayed in the subtitle editing area. Thus, a novel subtitle editing mode is provided.

20 Claims, 9 Drawing Sheets

(51) Int. Cl.
*G11B 27/031* (2006.01)
*G06F 40/131* (2020.01)
*G06F 40/169* (2020.01)

(58) Field of Classification Search
CPC ..... G06F 40/131; G06F 40/169; G11B 27/34; G11B 27/00; G11B 27/031
USPC ........................................................ 386/278
See application file for complete search history.

(56) References Cited

FOREIGN PATENT DOCUMENTS

| | | |
|---|---|---|
| CN | 104378692 A | 2/2015 |
| CN | 106792071 A | 5/2017 |
| CN | 108259971 A | 7/2018 |
| CN | 108833991 A | 11/2018 |
| CN | 108924622 A | 11/2018 |
| CN | 109257659 A | 1/2019 |
| CN | 109819301 A | 5/2019 |
| CN | 110781649 A | 2/2020 |
| CN | 111107422 A | 5/2020 |
| CN | 111147948 A | 5/2020 |
| CN | 111565330 A | 8/2020 |
| CN | 111970577 A | 11/2020 |
| KR | 2009-0124240 A | 12/2009 |

* cited by examiner

Meows are aliens who came to the earth.
Because of their cute appearance, they have won the trust of human beings and become one of the few friends who interact with human beings on an equal footing.
Meows cannot drink milk. Because cats have no enzyme to digest milk.
It's okay to have a few sips once in a while.

502

SUBTITLE EDITING METHOD AND APPARATUS, AND ELECTRONIC DEVICE

CROSS REFERENCE OF RELATED APPLICATION

The present application is the national phase of International Patent Application No. PCT/CN2021/114504, titled "SUBTITLE EDITING METHOD AND APPARATUS, AND ELECTRONIC DEVICE", filed on Aug. 25, 2021, which claims priority to Chinese Patent Application No. 202010868161.8, titled "SUBTITLE EDITING METHOD AND APPARATUS, AND ELECTRONIC DEVICE", filed on Aug. 25, 2020 with the China National Intellectual Property Administration, both of which are incorporated herein by reference in their entireties.

FIELD

The present disclosure relates to the technical field of the Internet, and in particular to a method and an apparatus for editing subtitles, and an electronic device.

BACKGROUND

With the development of the Internet, users are increasingly using terminal devices to browse various types of information. For example, the user may create a video on a terminal device, and may want to add appropriate subtitles to the video. Production of the subtitles may involve modifying the text, modifying the timeline and the like.

SUMMARY

This SUMMARY is provided to introduce concepts in a simplified form that are described in detail in the DETAILED DESCRIPTION that follows. This SUMMARY is neither intended to identify key features or essential features of the claimed technical solution, nor intended to limit the scope of the claimed technical solution.

In a first aspect, a method for editing subtitles is provided according to an embodiment of the present disclosure. The method includes: displaying a video playing area and a subtitle editing area, where the video playing area is for playing a target video, and the subtitle editing area is for editing a candidate subtitle corresponding to the target video; and displaying a video frame currently displayed in the video playing area and a subtitle displayed in the subtitle editing area in linkage.

In a second aspect, a method for editing subtitles is provided according to an embodiment of the present disclosure. The method includes: acquiring a candidate subtitle, where the candidate subtitle includes at least one subtitle text item, the subtitle text item is bound to a video time period, and the video time period bound to the subtitle text item is for displaying a subtitle and a video in linkage; and splitting a subtitle text item or merging a subtitle text item with another based on a unit editing operation for the subtitle text item, and binding a video time period to a newly generated subtitle text item.

In a third aspect, a method for editing subtitles is provided according to an embodiment of the present disclosure. The method includes: displaying a video playing interface, where the video playing interface is for playing a video and displaying a subtitle corresponding to a video frame; and displaying a video playing area and a subtitle editing area in response to a triggering operation for the subtitle. The subtitle editing area is for editing the subtitle, and the video playing area is for playing a target video.

In a fourth aspect, an apparatus for editing subtitles is provided according to an embodiment of the present disclosure. The apparatus includes: a first display unit and a second display unit. The first display unit is configured to display a video playing area and a subtitle editing area. The video playing area is for playing a target video. The subtitle editing area is for editing a candidate subtitle corresponding to the target video. The second display unit is configured to display a video frame currently displayed in the video playing area and a subtitle displayed in the subtitle editing area in linkage.

In a fifth aspect, an apparatus for editing subtitles is provided according to an embodiment of the present disclosure. The apparatus includes: an acquiring unit and a binding unit. The acquiring unit is configured to acquire a candidate subtitle. The candidate subtitle includes at least one subtitle text item. The subtitle text item is bound to a video time period. The video time period bound to the subtitle text item is for displaying a subtitle and a video in linkage. The binding unit is configured to split a subtitle text item or merge a subtitle text item with another based on a unit editing operation for the subtitle text item, and bind a video time period to a newly generated subtitle text item.

In a sixth aspect, an apparatus for editing subtitles is provided according to an embodiment of the present disclosure. The device includes: a third display unit and a fourth display unit. The third display unit is configured to display a video playing interface. The video playing interface is for playing a video and displaying a subtitle corresponding to a video frame. The fourth display unit is configured to display a video playing area and a subtitle editing area in response to a triggering operation for the subtitle. The subtitle editing area is for editing the subtitle. The video playing area is for playing a target video.

In a seventh aspect, an electronic device is provided according to an embodiment of the present disclosure. The electronic device includes: one or more processors and a storage apparatus. The storage apparatus is configured to store one or more programs. The one or more programs, when being executed by the one or more processors, cause the one or more processors to implement the method for editing subtitles according to the first aspect or the second aspect.

In an eighth aspect, a computer-readable medium storing a computer program is provided according to an embodiment of the present disclosure. The program, when being executed by the processor, implements steps of the method for editing subtitles according to the first aspect or the second aspect.

With the method and the apparatus for editing subtitles, as well as the electronic device according to the embodiments of the present disclosure, a video playing area and a subtitle editing area are displayed. A video frame currently displayed in the video playing area is related to a subtitle displayed in the subtitle editing area. In this way, subtitles are edited in a new manner, and the user can determine whether the candidate subtitle match the played target video, thereby improving the convenience for the user to edit subtitles based on video content. Therefore, the efficiency in editing subtitles by the user can be improved, and the accuracy of subtitles of the target video can be improved.

BRIEF DESCRIPTION OF THE DRAWINGS

The above and other features, advantages and aspects of embodiments of the present disclosure will become more apparent from the following DETAILED DESCRIPTION with reference to the drawings. Throughout the drawings, the same or similar reference numbers refer to the same or similar elements. It should be understood that the drawings are illustrative and that the originals and elements are unnecessarily drawn to scale.

DETAILED DESCRIPTION

Figure 1:
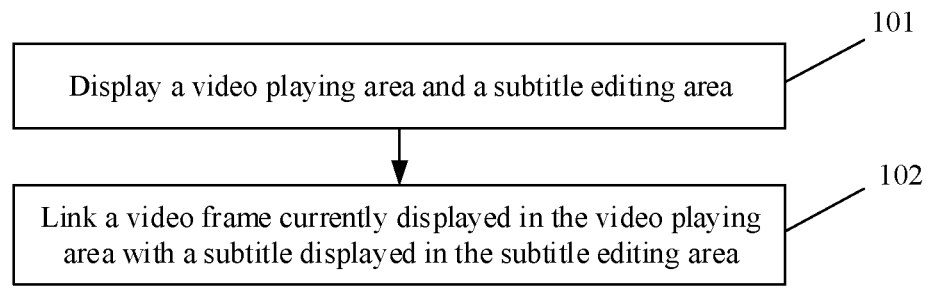
FIG. 1 is a flowchart illustrating a method for editing subtitles according to an embodiment of the present disclosure.

Embodiments according to the present disclosure will be described in more detail below with reference to the drawings. Although some embodiments according to the present disclosure are shown in the drawings, it should be understood that the present disclosure may be implemented in various forms and should not be construed as limited to the embodiments set forth herein. Instead, these embodiments are provided for a thorough and complete understanding of the present disclosure. It should be understood that the drawings and embodiments according to the present disclosure are only for illustration rather than intended to limit the protection scope of the present disclosure.

It should be understood that the steps described in the method embodiments according to the present disclosure may be performed in a different order and/or performed in parallel. Furthermore, method embodiments may include additional steps and/or illustrated steps may not be performed. The scope according to the present disclosure is not limited in this regard.

Herein, the term "including" and its variants are open-ended inclusion, i.e., "including but not limited to". The term "based on" is "based at least in part on". The term "an embodiment" indicates "at least one embodiment." The term "another embodiment" indicates "at least one additional embodiment". The term "some embodiments" indicates "at least some embodiments". Relevant definitions of other terms are given in the description below.

It should be noted that concepts such as "first" and "second" herein are for distinguishing apparatuses, modules or units only, neither defining that these apparatuses or units must be different from each other nor defining the order or interdependence of functionalities performed by these apparatuses, modules or units.

It should be noted that the determiners such as "a" and "a plurality" herein are illustrative rather than restrictive. It should be understood by those skilled in the art that unless the context clearly dictates otherwise, "a" and "a plurality" should be construed as "one or more".

The name of a message or information exchanged between apparatus according to the embodiments of the present disclosure are only for illustrative purpose rather than limiting the scope of the message or information.

Reference is made to FIG. 1, which is a flowchart illustrating a method for editing subtitles according to an embodiment of the present disclosure. The method for editing subtitles is applied to a terminal device. As shown in FIG. 1, the method for editing subtitles includes the following steps 101 to 102.

In step 101, a video playing area and a subtitle editing area are displayed.

In this embodiment, an execution subject (for example, the terminal device) of the method for editing subtitles may display the video playing area and the subtitle editing area.

Here, the video playing area is for playing a target video.

Here, the subtitle editing area is for editing a candidate subtitle. That is, a subtitle candidate area displays the candidate subtitle, and displays a modified subtitle in response to an editing operation performed by a user on the candidate subtitle.

In this embodiment, the "target" in the target video is for the convenience of description rather than being specific to the video. In practical application scenarios, the target video may be any video.

In this embodiment, the target video may correspond to the candidate subtitle.

In general, the candidate subtitle may include subtitles of the target video. The subtitles of the target video may be text corresponding to audio bound to the target video.

It should be understood that in a case of no editing operation performed by the user, that is, the user watches the subtitles rather than edits the subtitles, the subtitle editing area may serve as a subtitle display area for the user to check whether the video currently played in the video playing area corresponds to the subtitles currently displayed in the subtitle editing area.

In this embodiment, the subtitle editing area may not or partially overlap with the video playing area. Alternatively, one of the subtitle editing area and the video playing area is arranged in the other of the subtitle editing area and the video playing area (e.g., the subtitle editing area is arranged in the video playing area).

In some embodiments, at least two subtitle text items may be displayed in the subtitle editing area.

Here, the predefined subtitle editing initiation operation may be a predefined operation for initiating batch editing. Details of the subtitle editing initiation operation depend on actual application scenarios, and thus are not limited hereto.

In step 102, a video frame currently displayed in the video playing area is related to a subtitle displayed in the subtitle editing area.

In this embodiment, the execution subject may display the video frame currently displayed in the video playing area and the subtitles displayed in the subtitle editing area in linkage.

Here, the linkage may include synchronously displaying the video frame and the subtitle corresponding to the video frame.

In some application scenarios, the subtitle displayed in the subtitle editing area adapts to a change in the video frame displayed in the video playing area.

Optionally, the change in the video frame that is currently displayed may be resulted from normal playing of the video or a switch for one video to another, or the like.

Optionally, when the video frame that is currently displayed changes, each subtitle in candidate subtitles may be visited. Each subtitle has a start time instant and an end time instant. An interval between the start time instant and the end time instant is a video time period. If it is found that a video instant of the video frame currently displayed is within a video time period of a subtitle, the subtitle is displayed. If it is found that a video instant of the video frame currently displayed is not within a video time period of any subtitle, the currently played frame has no editable subtitle, and no adaptation is made to the subtitle editing area.

In some application scenarios, the video frame displayed in the video playing area adapts to subtitles displayed in the subtitle editing area.

In some application scenarios, a subtitle in the subtitle editing area may be changed in response to a selection operation performed by the user. After the user selects a subtitle in the subtitle editing area, the playing progress of the video in the video playing area may be positioned to correspond to a start time instant of the selected subtitle, so as to synchronize the subtitle with the playing progress.

It should be noted that with the method for editing subtitles according to the embodiment of the present disclosure, a video playing area and a subtitle editing area are displayed, and a video frame currently displayed in the video playing area is related to a subtitle displayed in the subtitle editing area. In this way, subtitles are edited in a new manner, and the user can determine whether the candidate subtitle matches the played target video, thereby improving the convenience for the user to edit subtitles based on video content. Therefore, the efficiency in editing subtitles by the user can be improved, and the accuracy of subtitles of the target video can be improved.

In some embodiments, the method further includes: indicating, in a predefined progress indication and in the subtitle editing area, a subtitle corresponding to the video frame currently played in the video playing area.

In some application scenarios, the subtitle corresponding to the video frame currently played may be determined as follows. It is determined whether the current playing progress (for example, a video instant currently played to) is within a video time period corresponding to the subtitle text item. If it is determined that the current playing progress is within the video time period corresponding to the subtitle text item, the subtitle text item corresponding to the video time period in which the current playing progress is located is determined as the subtitle text item corresponding to the video frame currently played. If it is determined that the current playing progress is not within the video time period corresponding to the subtitle text item, the current playing progress has no corresponding subtitle, and the predefined progress indication may not be displayed.

For example, the progress indication may include highlighting, underlining, a different font, displaying in a preset designated area, and so on.

In some application scenarios, the progress indication may be displayed in a preset designated area. The subtitle text item corresponding to the video currently played is scrolled to the preset designated area.

It should be noted that the progress indication is displayed in the subtitle editing area to remind the user of the subtitle corresponding to the video frame currently played, so that the user can check whether the subtitle matches the video frame, thereby improving the accuracy of the subtitles of the target video.

Figure 2:
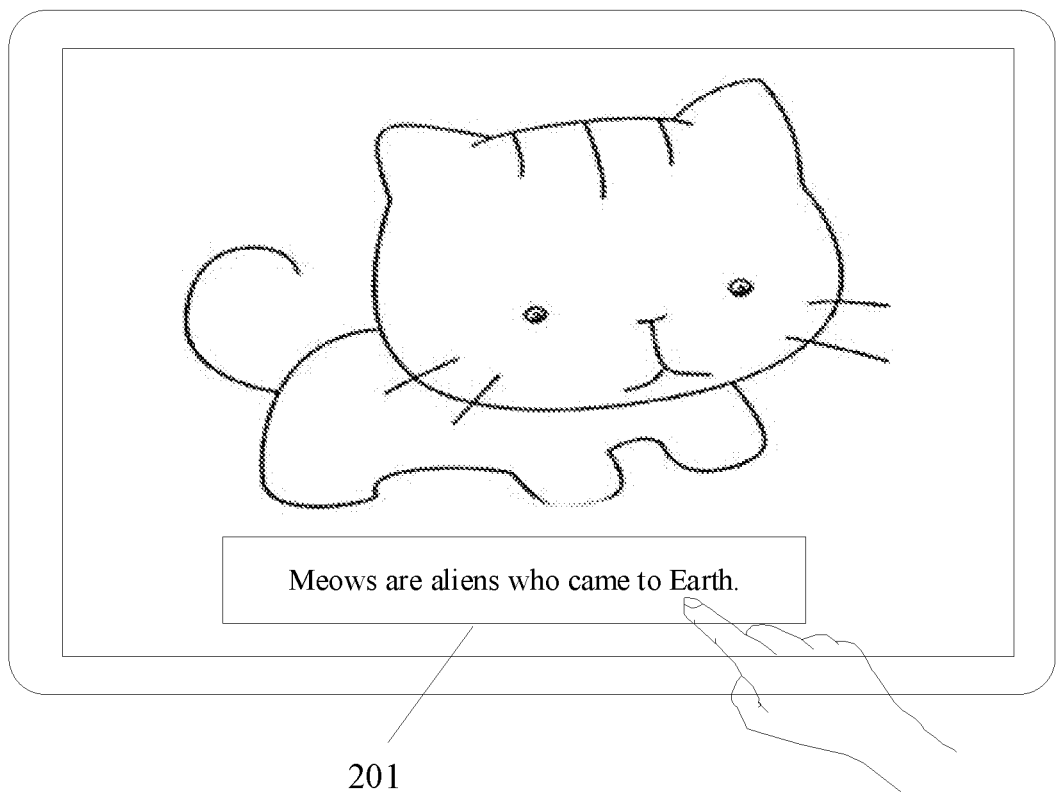
FIG. 2 is a schematic diagram illustrating an application scenario of the method for editing subtitles according to the present disclosure.
Figure 3:
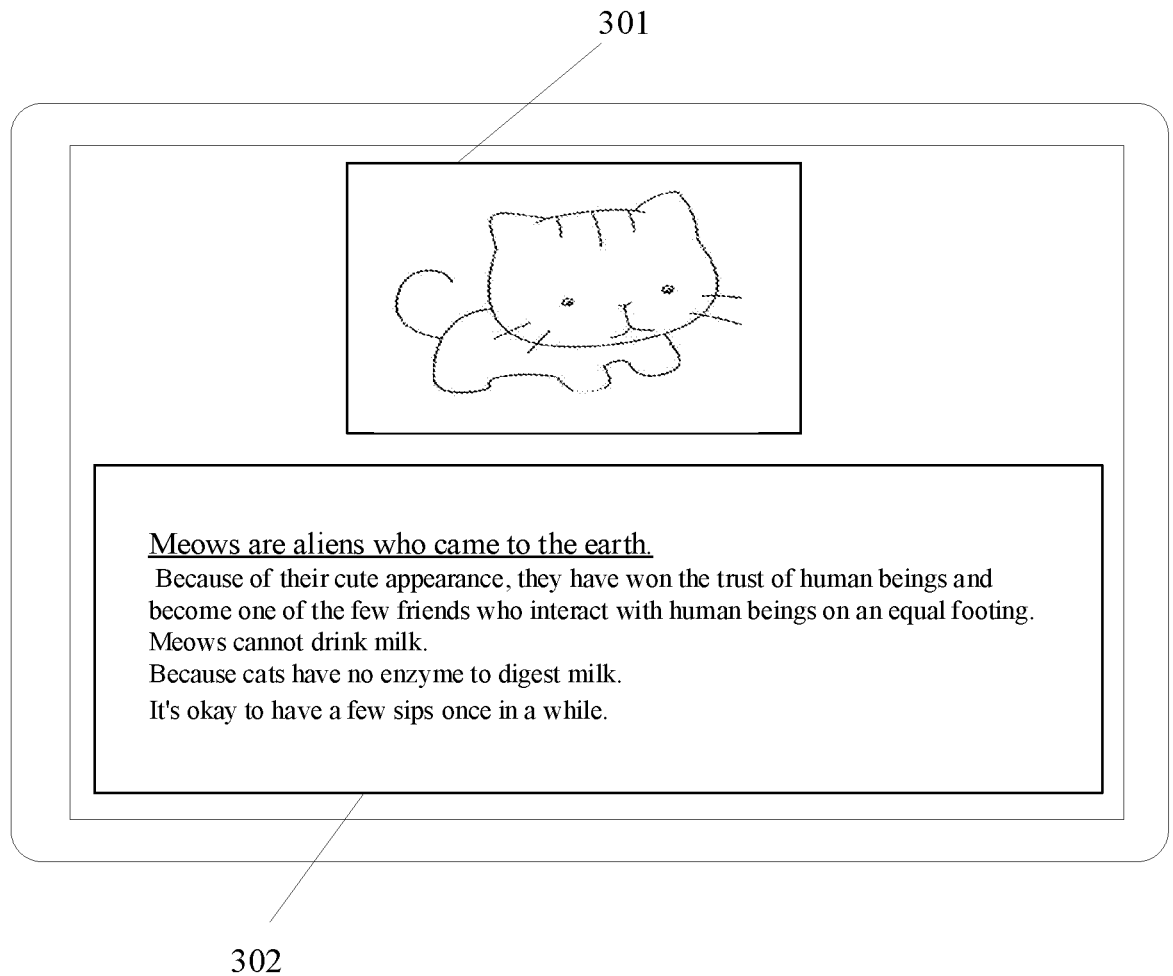
FIG. 3 is a schematic diagram illustrating an application scenario of the method for editing subtitles according to the present disclosure.

Reference is made to FIG. 2 and FIG. 3, each of which illustrates an application scenario of the method for editing subtitles according to the present disclosure.

As shown in FIG. 2, the terminal device plays the target video on the screen. For example, the video frame currently played in the target video includes a cat image. The terminal device also displays a subtitle 201 corresponding to the video frame currently played. The user may click on the subtitle 201, and the operation of the user clicking on the subtitle may be understood as the subtitle editing initiation operation.

As shown in FIG. 3, the terminal device displays a video playing area 301 and a subtitle editing area 302 in response to the user clicking on the subtitle 201. The target video is played in the video playing area 301. The subtitle editing area 302 displays candidate subtitles corresponding to the target video, and may respond to the subtitle editing operation for the candidate subtitles.

For example, the candidate subtitle may include the candidate subtitle text "Meows are aliens who came to the earth", "Because of their cute appearance, they have won the trust of human beings and become one of the few friends who interact with human beings on an equal footing", "Meows cannot drink milk", "Because cats have no enzyme to digest milk", "Meows will have diarrhea if they drink too much milk", and "It's okay to have a few sips once in a while".

For example, referring to FIG. 3, the subtitle corresponding to the video frame currently played is "Meows are aliens who came to the earth". "Meows are aliens who came to the earth" is displayed in larger font and is underlined as an indication. The larger font and the underlining in FIG. 3 may be understood as the predefined progress indication.

In some embodiments, the method further includes: displaying a video frame corresponding to a subtitle text item in the video playing area in response to a selection operation for a subtitle in the subtitle editing area.

Here, the execution subject may display the video frame corresponding to the subtitle in response to the selection operation on the subtitle.

It should be understood that the selection operation for the subtitle text item may be performed in the subtitle editing area. The video frame corresponding to the subtitle text item may be displayed in the video playing area.

In some application scenarios, the user selects a subtitle in the subtitle editing area, and the video playing area displays the video frame corresponding to the subtitle. In a case that a video frame displayed in the video playing area before the selection operation by the user is different from the video frame corresponding to the subtitle targeted by the selection operation, the video playing area quickly switches to the video frame corresponding to the selected subtitle.

Optionally, the selection operation may be performed during a pause of the video or playing of the video.

It should be noted that the user can switch the video frame displayed in the video playing area by selecting the subtitle, so that the user can conveniently view the video frame corresponding to the selected subtitle when editing subtitles in batches, thereby improving the efficiency in editing subtitles.

In some embodiments, the method further includes: playing audio corresponding to the video frame currently displayed in the video playing area.

Here, the audio is played correspondingly while playing the video, so that the user can refer to the real sound to determine whether the subtitle is correct, which is convenient for the user to edit subtitles, thereby improving the accuracy of the subtitles.

In some embodiments, before the step 101, the method further includes: displaying target video indication information. Here, the target video indication information is for indicating the target video. The specific form of the target video indication information is set and determined depending on the actual application scenarios, and is not limited here.

In some embodiments, the target video indication information may be the target video itself, a cover of the target video, or a title of the target video. For example, the displaying the target video indication information may include at least one of, but is not limited to: displaying a title of the target video, and playing the target video.

In some application scenarios, the subtitle editing initiation operation may be performed during a pause of the video or playing of the video.

In some embodiments, the method further includes: playing the target video in the video playing interface, and displaying the subtitle editing area in response to the predefined subtitle editing initiation operation.

In some application scenarios, the terminal device plays the target video, and displays candidate subtitle in the played video. The user may perform a subtitle editing initiation operation while playing the video. The terminal device then displays the video playing area and the subtitle editing area.

It should be noted that during playing of the target video, the terminal device switches to a subtitle editing mode (i.e., displays the video playing area and the subtitle editing area) in response to the operation performed by the user, so that the user can quickly edit subtitles in the subtitle editing mode when watching a video and wanting to edit subtitles. Therefore, the time period from wanting to edit subtitles to starting editing the subtitles can be shortened, thereby increasing an overall speed of the user editing the subtitles.

In some embodiments, the subtitle editing initiation operation may include a triggering operation for the candidate subtitle displayed on the video playing interface.

Here, the displayed subtitle may be the candidate subtitle presented in the target video. For example, the subtitle 201 in FIG. 2 may be understood as the candidate subtitle displayed.

For example, the response to a triggering operation for the subtitle includes: determining a touchpoint position of the triggering operation, determining that the triggering operation for the subtitles is successfully detected when the touchpoint position is within an area displaying the subtitles.

Alternatively, an editing control associated with the subtitle may be provided. Triggering the editing control by the user may serve as the triggering operation for the subtitle.

It should be noted that the triggering operation for the displayed candidate subtitle serving as the subtitle editing operation can effectively capture the desired operation of editing subtitles by the user, so that the user can quickly edit the subtitles in the subtitle editing mode when watching the video and wanting to edit the subtitles. Therefore, the time period from wanting to edit subtitles to starting editing the subtitles can be shortened.

In some embodiments, the method further includes: determining the subtitle triggered in the video playing interface as a subtitle to be edited in the subtitle editing area.

For example, in response to the user triggering the subtitle 201 in FIG. 2, subtitle text of the subtitle 201 is determined as the subtitle to be edited in the subtitle editing area.

In some application scenarios, the cursor is placed in the area displaying the subtitle in order to determine the subtitle to be edited in the subtitle editing area. Therefore, the user unnecessarily spends time searching for the subtitle to be edited, thereby improving the efficiency in editing subtitles.

In some embodiments, the subtitle editing initiation operation may include: a triggering operation on a preset subtitle editing initiation control.

Here, the preset subtitle editing initiation control refers to a control for initiating subtitle editing.

Here, the specific display form and position of the subtitle editing initiation control may be set according to the actual application scenarios, and are not limited herein. For example, a control labelled with "subtitle editing" is arranged on the video playing screen as the subtitle editing initiation control.

It should be noted that the subtitle editing initiation operation is preset, which can effectively prompt an entry for initiating subtitle editing, thereby reducing the time for the user to search for the entry for subtitle editing.

In some embodiments, the method further includes: displaying, based on a subtitle browsing operation for the subtitle editing area, the subtitle in the subtitle editing area in a free browsing mode while playing the target video.

For example, the subtitle browsing operation is for triggering the subtitle (or subtitle text item) displayed in the free browsing mode in the subtitle editing area. The specific implementation of the subtitle browsing operation may depend on the actual application scenarios, and is not limited herein.

For example, the subtitle browsing operation may be a page turning operation, or a swiping operation in the subtitle editing area.

Here, in the free browsing mode, the user browses the subtitles in the subtitle editing area, and no subtitle text item is selected. The free browsing mode may be compared to a display mode in which the mouse wheel is scrolled in the document and the document is displayed according to the user operation.

It should be noted that, the user freely browses the subtitle text in the subtitle editing area while playing the target video, which helps the user to view the part of the candidate subtitle that is not displayed. In this way, the subtitle editing area can be updated, in a relatively fixed size, timely according to the user operation, which improves the efficiency in displaying information, thereby facilitating viewing by the user and improving the efficiency in editing subtitles.

In some embodiments, at least two subtitle text items of the candidate subtitle are displayed in the subtitle editing area.

Here, the subtitle text item is bound to a video time period. Further, in the video time period bound to the subtitle text item, the audio indicated by the subtitle text item is played synchronously with the video frame displayed in the video playing area.

That is, the candidate subtitle may include one or at least two subtitle text items. The subtitle text item may be understood as a measurement unit of subtitle display. Briefly, a subtitle text item may be understood as a subtitle. A subtitle may contain one or more characters. The subtitles (i.e. subtitle text items) are usually divided based on the semantic relationship between characters.

It should be noted that the at least two subtitle text items may be displayed in the subtitle editing area, so that the user can edit the subtitle text items in batches, thereby improving the operation efficiency.

In some embodiments, the candidate subtitle is obtained based on speech recognition on the audio corresponding to the target video.

Here, the candidate subtitle may include a subtitle text item. The subtitle text item is bound to the video time period.

Here, speech recognition is performed on the audio corresponding to the target video, so that text corresponding to the audio of the target video is obtained. In addition, speech recognition is performed on the target video, and text (e.g., a word, an expression or a sentence) corresponding to each audio data segment is bound. Therefore, each recognized sentence can be automatically bound to the video time period.

Here, the subtitle text item obtained by recognizing the audio in a target video time period is bound to the target video time period. Here, the target video time period may be any time period of the target video. The "target" in the target video time period is for convenience of narration and does not constitute a restriction on the video time period.

Here, a subtitle text item may be played within the video time period bound to the subtitle text item.

For example, referring to FIG. 3, the subtitle text item "Meows are aliens who came to the earth" may be bound to a video time period from a moment when the video starts (00:00) to the 10th second (00:10) of the video. The subtitle text item "Meows are aliens who came to the earth" may be displayed during the video time period from 00:00 to 00:10. Optionally, the characters in "Meows are aliens who came to the earth" may be displayed together or in several parts sequentially. For example, "Meows" may be displayed first, then "are aliens" is displayed, and finally "who came to the earth" is displayed.

It should be noted that the candidate subtitle is obtained through speech recognition and the video time period is bound to the subtitle text item in the candidate subtitle, which can improve the speed and accuracy of binding the subtitle text item to the video time period.

In some embodiments, the method further includes: enabling, in response to determination that the target video is paused, a function of the subtitle editing area responding to the subtitle editing operation.

Here, the function of the subtitle editing area responding to the editing operation may include that the subtitle editing area detects the subtitle editing operation and updates the subtitle displayed in the subtitle editing area based on the detected subtitle editing operation.

In some application scenarios, the function of the subtitle editing area responding to the subtitle editing operation may be disabled throughout the playing of the target video. The function of the subtitle editing area responding to the subtitle editing operation is enabled when the target video is paused. In this way, the orderliness of user operations can be improved, thereby improving the efficiency in user operations and the accuracy of subtitles.

If the user edits the subtitles while the video is playing, the video in the video playing area may be played too fast, and thus it is difficult for the user to pay attention to both the subtitle being edited and the subtitle corresponding to the video frame being played. As a result, the user may miss subtitles corresponding to some video frames and thus has to play the video repeatedly for checking, resulting in frequent operations and lower accuracy.

Therefore, the function of responding to the editing operation is enabled when the video is paused, thereby improving the efficiency in user operations and the accuracy of subtitles.

In some embodiments, the target video may be paused in response to a triggering operation for the subtitle text item in the subtitle editing area.

In some embodiments, the triggering operation for the subtitle text item in the subtitle editing area includes the selection operation for the subtitle text item in the subtitle editing area.

Here, the subtitle text item is bound to a subtitle editing sub-area, and is bound to a playing time period. Subtitle text in the subtitle text item is displayed during the playing time period (in the video playing area).

It should be noted that the target video is paused when the user performs a triggering operation (such as a selection operation) on a subtitle text item in the subtitle editing area, which can speed up the process of the user switching to the subtitle editing, thereby speeding up the subtitle editing by the user.

In some embodiments, the target video is paused in response to a preset triggering operation for the video playing area.

In some embodiments, the triggering operation for the video playing area may include an operation performed in the video playing area.

For example, the preset triggering operation for the video playing area may include a click operation in the video playing area. In response to this click operation, the video is paused.

It should be noted that, the video is paused and the function of responding to the editing operation is enabled in response to the preset triggering operation performed by the user in the video playing area, which can speed up the process of the user switching to the subtitle editing.

In some embodiments, the method further includes: updating the candidate subtitle displayed in the subtitle editing area based on the subtitle editing operation in the subtitle editing area.

Here, the subtitle editing operation may include a text editing operation for subtitle text and a unit editing operation for the subtitle text item. The unit editing operation for the subtitle text item may include modifying a relationship between subtitle text items, such as splitting a subtitle text item and merging subtitle text items.

It should be noted that the candidate subtitle displayed in the subtitle editing area is updated based on the subtitle editing operation. In this way, the edited subtitle is displayed in time when the user edits the subtitles, which is convenient for the user to determine whether the editing is correct. Therefore, the efficiency in editing subtitles by the user can be improved.

In some embodiments, the subtitle editing operation may include a text editing operation. The method further includes: in response to the text editing operation on the subtitle text, updating subtitle text in the subtitle editing area and maintaining the time period bound to a subtitle text item targeted by the text editing operation unchanged.

Here, the text editing operation is performed to modify the subtitle text item, that is, the subtitle text in the subtitle text item, without changing the video time period to which the subtitle text item is bound.

Therefore, during the process of modifying the subtitle text in the subtitle text item, it is ensured that the video time period bound to the subtitle text item is relatively stable, thereby ensuring the consistency between the subtitle text item and the corresponding video frame.

In general, the segmentation among subtitle text items is accurate, that is, words in sentence A are not confused with words in sentence B. Since a moment when the sentence A starts and a moment when the sentence A ends are relatively accurate, the addition or deletion of words in sentence A is within the video time period bound to the sentence A. Therefore, in the process of modifying the text in the subtitle text item, the correspondence between the subtitle text item and the video frame can be remained unchanged, so as to avoid the situation that the video frame does not match the subtitle.

Here, the editing in the text editing operation may include, but is not limited to, addition, deletion, modification, and the like.

In some application scenarios, the user adds words to the candidate subtitle.

In some application scenarios, the user deletes words from the candidate subtitle.

In some application scenarios, the user modifies the words in the candidate subtitle.

In some application scenarios, the subtitle editing area may be understood as a text box when the user performs text editing operations in the subtitle editing area. It should be understood that operations that may be performed in a general text box may also be performed in the subtitle editing area.

It should be noted that, through the text editing operation, the user can modify the text of the candidate subtitle in time, thereby improving the accuracy of the subtitles corresponding to the target video. In some application scenarios, the candidate subtitle is obtained through speech recognition. Through the text editing operation, the user can correct the results obtained by speech recognition, thereby improving the accuracy of the subtitles corresponding to the target video.

In some embodiments, the subtitle editing operation includes a unit editing operation.

In some embodiments, the method further includes: splitting a subtitle text item or merging a subtitle text item with another based on the unit editing operation for the subtitle text item, and binding a video time period to a newly generated subtitle text item.

Here, one subtitle text item may be split into at least two subtitle text items.

Here, at least two subtitle text items may be merged into one subtitle text item.

Here, a subtitle text item may be split and at least two subtitle text items may be merged based on the unit editing operation in units of subtitle text items.

It should be noted that the subtitle text item is bound to the video time period. In the process of splitting a subtitle text item or merging subtitle text items, the execution subject can automatically bind the video time period to the newly generated subtitle text item. Therefore, it is unnecessary to manually adjust the video time period for subtitles, thereby reducing the difficulty in editing subtitles and improving the efficiency in editing subtitles. In addition, the splitting a subtitle text item or merging subtitle text items can effectively make up for the disadvantages of speech recognition in sentence segmentation and improve the overall accuracy of the candidate subtitles.

In some embodiments, the unit editing operation may include a splitting operation.

Here, the splitting operation is for splitting at least two subtitle text items.

Here, the implementation of the splitting operation may be set according to the actual application scenario, and is not limited herein.

For example, the splitting operation may include segmenting a subtitle text item.

In some application scenarios, the execution subject splits a subtitle text item into at least two subtitle text items in response to a splitting operation on the subtitle text item. The at least two subtitle text items are displayed asynchronously or displayed in different display areas. Here, asynchronous display may include non-simultaneous display. Briefly, the two subtitle text items are different from each other, and one may be displayed after the other. Alternatively, the two subtitles are displayed in different displaying areas, for example, an upper displaying area and a lower displaying area.

In some embodiments, the splitting a subtitle text item or merging a subtitle text item with another based on the unit editing operation for the subtitle text item includes: in response to the splitting operation, dividing a video time period bound to the subtitle text item before splitting based on a proportion of each subtitle text item obtained by splitting in the subtitle text item before splitting; and binding video time periods obtained by division to subtitle text items obtained by splitting, respectively.

It should be noted that, in response to the splitting operation, the video time period bound to the subtitle text item before splitting is divided based on the subtitle text item obtained by splitting. Therefore, the speed of binding the video time period to the newly generated subtitle text item can be improved under the condition that the video time periods respectively bound to the split subtitle text items match the audio.

Figure 4A:
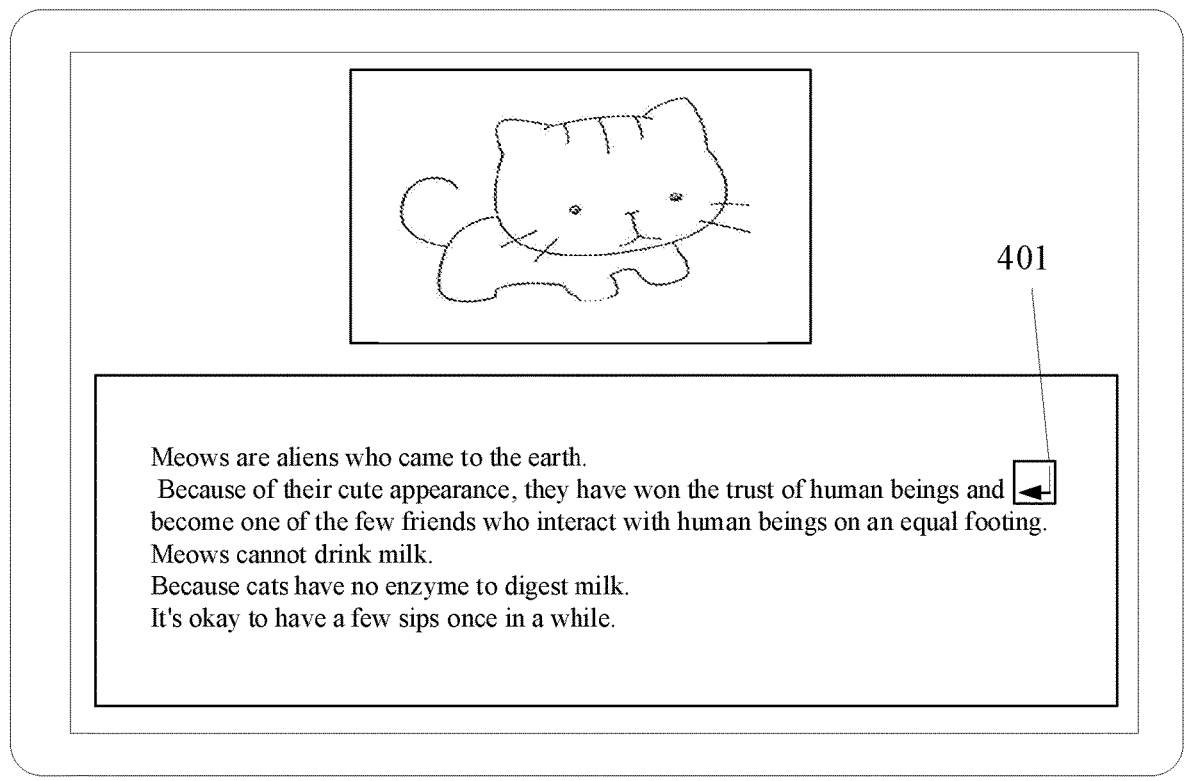
FIGS. 4A and 4B each are a schematic diagram illustrating another application scenario of the method for editing subtitles according to the present disclosure.
Figure 4B:
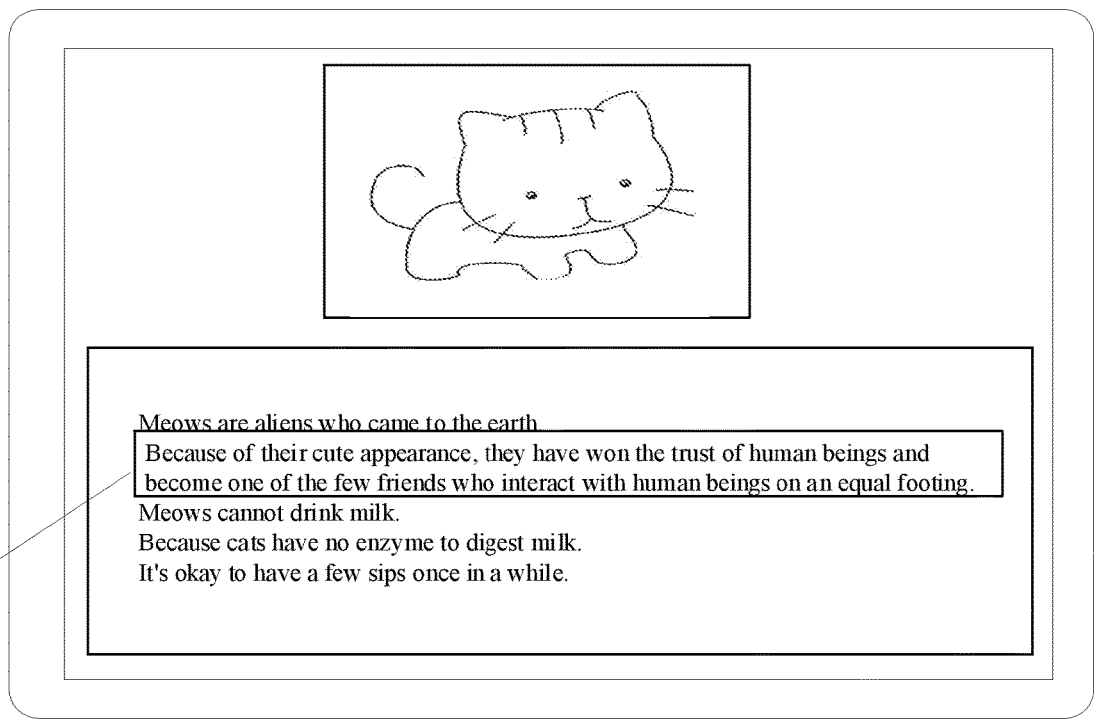

In some application scenarios, reference is made to FIG. 4A and FIG. 4B, which illustrate application scenarios of the splitting operation.

In FIG. 4A, the user performs a line break operation in the middle (e.g., at the comma) of the subtitle text item "Because of their cute appearance, they have won the trust of human beings and become one of the few friends who interact with human beings on an equal footing". The position at which the line break operation is performed is indicated by a reference numeral 401. Then, referring to FIG. 4B, in response to the line break operation, the original subtitle text item is split into two subtitle text items, and the two split subtitle text items are shown in the indication box 402 in FIG. 4B.

In some embodiments, the proportion of the subtitle text item obtained by splitting in the subtitle text item before the splitting includes: a ratio of the number of words in the subtitle text item obtained by splitting to the total number of words in the subtitle text item before splitting.

In some application scenarios, the proportion is calculated based on the number of words. There are 14 characters for "Because of their cute appearance, they have won the trust of human beings and", and 14 words for "成为少数与人类平等交往的朋友" (which is "become one of the few friends who interact with human beings on an equal footing" in English). The position of the line break operation indicated by the indicator 401 in FIG. 4A divides the subtitle text item before splitting into 15:14 (representing 15 to 14). The time period bound to the subtitle text item before the splitting is divided according to 15:14.

For example, the video time period bound to the subtitle text item before splitting ranges from first minute and 1 second to first minute and 29 seconds. The split subtitle text item "因为很萌的外表 而获得人类的信任" (which is "Because of their cute appearance, they have won the trust of human beings" in English) is bound to a video time period from the first minute and 1 second to the first minute and 14 seconds. The split subtitle text item "成为少数与人类平等交往的朋友" (which is "become one of the few friends who interact with human beings on an equal footing" in English) is bound to a video time period from the first minute and 15 seconds to the first minute and 29 seconds.

It should be noted that the proportion of a time period is calculated based on the proportion of words, so that the proportion can be quickly determined and splitting is performed, thereby improving the splitting speed.

In some embodiments, the proportion of the subtitle text item obtained by splitting in the subtitle text item before the splitting includes: a ratio of the audio duration corresponding to the subtitle text item obtained by splitting to the total audio duration corresponding to the subtitle text item before splitting.

In some application scenarios, the proportion is calculated based on the audio duration. For example, the audio duration corresponding to "因为很萌的外 表而获得人类的 信任" (which is "Because of their cute appearance, they have won the trust of human beings" in English) is 12 seconds. The audio duration corresponding to "成为少数与 人类平等交往的 朋友" (which is "become one of the few friends who interact with human beings on an equal footing" in English) is 8 seconds. That is, the first half sentence accounts for 60%, and the second half sentence accounts for 40%. The position of the line break operation indicated by the indicator 401 in FIG. 4A divides the subtitle text item before splitting into 3:2 (representing 3 to 2). The time period bound to the subtitle text item before splitting is divided according to 3:2.

For example, the video time period bound to the subtitle text item before splitting ranges from the first minute and 1 second to the first minute and 30 seconds. The subtitle text item "因为很萌的 外表而获得 人类的信任" (which is "Because of their cute appearance, they have won the trust of human beings" in English) obtained by splitting is bound to a video time period from the first minute and 1 second to the first minute and 18 seconds. The split subtitle text item "成为少数与人 类平等交往的朋友" (which is "become one of the few friends who interact with human beings on an equal footing" in English) obtained by splitting is bound to a video time period from the first minute and 19 seconds to the first minute and 30 seconds.

It should be noted that the calculation of the proportion based on the audio duration can fully take into account differences in speech pauses in the actual scene as well as the length and short sounds of different words. Therefore, the accuracy of splitting the video time period for splitting the subtitle text item is improved, thereby improving the degree of synchronization between the video and the subtitles.

In some embodiments, the unit editing operation includes a merging operation.

Here, the merging operation is for merging at least two subtitle text items.

Here, the specific implementation of the merging operation may be set according to the actual application scenarios, and thus is not limited herein.

In some embodiments, the splitting a subtitle text item or merging subtitle text items with another based on the unit editing operation for the subtitle text item includes: in response to the merging operation, merging at least two subtitle text items targeted by the merging operation, and merging video time periods respectively bound to the at least two subtitle text items.

For example, the merging operation may include deleting division (e.g., a segment identifier) of two subtitle text items.

In some application scenarios, in response to a merging operation for the subtitle text item, the execution subject merges at least two subtitle text items to generate a new subtitle text item. The generated new subtitle text item is played within the video time period to which the new subtitle text item is bound.

Figure 5A:
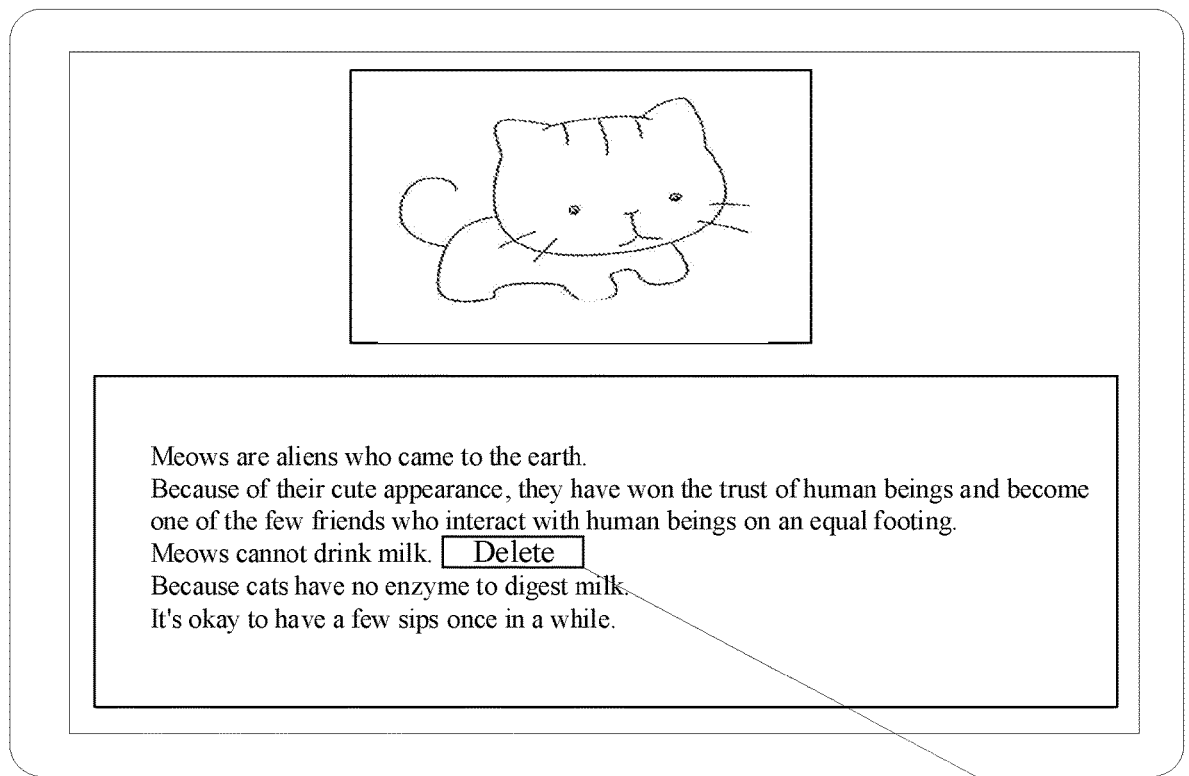
FIGS. 5A and 5B each are a schematic diagram illustrating another application scenario of the method for editing subtitles according to the present disclosure.
Figure 5B:
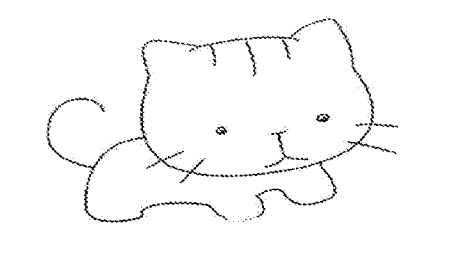

In some application scenarios, reference is made to FIGS. 5A and 5B, each of which illustrates an application scenario of the merging operation.

In FIG. 5A, the user performs an operation of deleting division at the position indicated by a delete symbol 501. Here, the operation of deleting division may be understood as the merging operation. Then, referring to FIG. 5B, in response to the merging operation, the original two subtitle text items are merged into one subtitle text item. The generated subtitle text item is shown in an indication box 502 in FIG. 5B.

Here, the video time period bound to the subtitle text item "喵星人不能喝牛奶" (which is "Meows cannot drink milk" in English) before merging ranges from the first minute and 31 seconds to the first minute and 40 seconds. The time period bound to the subtitle text item "因为喵星人没 有消化牛奶的酶" (which is "Because cats have no enzyme to digest milk" in English) before merging ranges from the first minute and 41 seconds to the first minute and 50 seconds. The generated subtitle text item "喵星人不能喝 牛奶。因为喵 星人没有消化牛奶的酶" (which is "Meows cannot drink milk. Because cats have no enzyme to digest milk" in English) may be bound to the time period from the first minute and 31 seconds to the first minute and 50 seconds.

It should be noted that, in response to the merging operation, the at least two subtitle text items targeted by the merging operation are merged, and the newly generated subtitle text item is automatically bound to the video time period, thereby reducing the overall time spent on editing the candidate subtitles, that is, improving the efficiency in editing subtitles.

In some embodiments, subtitle text in a single subtitle text item is stored in the same storage unit, and different subtitle text items are stored in individual storage units.

In some application scenarios, the storage unit may be a physical storage location or a unit under a preset data structure.

For example, the storage unit may be an array. That is, subtitle text in a single subtitle text item may be stored in the same array, and different subtitle text items may be stored in different arrays.

It should be noted that different subtitle text items are stored in separate storage units so as to distinguish the subtitle text items, which is convenient to set respective self-attributes (e.g. video time period, text controls, etc.) for the subtitle text items.

In some embodiments, the method further includes: setting a self-attribute for the storage unit in which the single subtitle text item is stored. Here, the self-attribute is for indicating a self-characteristic of the subtitle text item.

For example, the self-attribute may include, but is not limited to, at least one of: a multimedia time period (for example, including a video time period and/or an audio time period) bound to the subtitle text item, a text control bound to the subtitle text item, an editing triggering control bound to the subtitle text item (where editing of the subtitle text item is triggered in response to the editing triggering control or region of the subtitle text item being triggered), and so on.

Here, the self-attribute may be linked with the storage unit. For example, a subtitle text item A may be stored in a storage unit B. The video time period bound to the subtitle text item A may be bound to the storage unit B. In this way, the self-attribute is set for the subtitle text A. In this way, even if the subtitle text item changes during the process that the subtitle text item is operated, the integrity of the subtitle text item can be ensured because the changing subtitle text is set in an independent storage unit, thereby ensuring the stability of its self-attribute. That is, in the process of editing subtitle text in the subtitle text item, the self-attribute of the subtitle text item remains unchanged. For example, the time period to which the subtitle text item is bound remains unchanged. For example, the time period bound to the subtitle text item "喵星人不能喝 牛奶。因为喵 星人没有消化 牛奶的酶" (which is "Meows cannot drink milk. Because cats have no enzyme to digest milk" in English) ranges from the first minute and 31 seconds to the first minute and 50 seconds. After "喵星人" (which is "Meows" in English) in this subtitle text item is modified into "汪 汪星人" (which is "Dogs" in English), the time period bound to the subtitle text item " 注注 星人不能喝牛奶。因为汪汪星人 没有消化牛奶的酶" (which is "Dogs cannot drink milk. Because dogs have no enzyme to digest milk" in English) still ranges from the first minute and 31 seconds to the first minute and 50 second.

It should be noted that, in a case that only the text content is edited without splitting the subtitle text item or merging subtitle text items, the time period bound to the subtitle text item remains unchanged, not only the accuracy of the subtitle text content is improved, but also the situation of erroneously modifying the video time period or audio time period bound to the subtitle text due to editing the content of the subtitle text can be avoided. Subtitle text items are generally divided according to pauses and semantic groups. This division is relatively accurate. Therefore, the time period to which the subtitle text item is bound remains unchanged, so as to ensure the time accuracy of the semantic group obtained by taking the subtitle text item as a unit. However, specific words within the semantic group may be recognized incorrectly, this does not affect division of the time period of the semantic group. Therefore, the text content in the text item is edited based on the text content editing operation, so as to improve the content accuracy of the obtained subtitle text.

It should be noted that the subtitle text item is stored in the data format of an array, so that the characters in the array can be quickly modified, thereby reducing the storage space occupied and improving the speed of the subtitle editing.

In some application scenarios, the at least two subtitle text items generated based on the splitting operation are stored in different storage units.

Here, the at least two subtitle text items generated after splitting are stored in different storage units, so that the self-attribute of the newly generated subtitle text item can be effectively set. Therefore, a subtitle can be quickly separated in practice, thereby matching the subtitle and the video frame.

In some application scenarios, the subtitle text item generated based on the merging operation is stored in the same storage unit.

Here, the subtitle text item generated after the merging operation is stored in the same storage unit, so that the self-attribute of the newly generated subtitle text item can be effectively set. Therefore, subtitles can be quickly merged in practice, thereby matching the subtitle and the video frame.

In some embodiments, the subtitle editing area includes a text control bound to the subtitle text item.

In some application scenarios, the subtitle editing area includes at least two subtitle editing sub-areas. The subtitle editing sub-area is for displaying one subtitle. The subtitle editing sub-area is bound to the subtitle text item. A size of the subtitle sub-area adapts to the number of words in the subtitle text item.

In some application scenarios, the subtitle editing sub-area may be understood as a text control. The position at which the text control is arranged adapts to the playing progress of the video. Visually, the subtitle text item may move in the subtitle editing area.

It should be understood that different text controls visually correspond to different text paragraphs. That is, different paragraphs visually correspond to different text controls.

Here, the text control is for displaying subtitle text in the subtitle text item to which the text control is bound.

It should be noted that subtitle text items are displayed in their individual text controls. Therefore, in the process of editing a subtitle text item, the user is prompted to distinguish subtitle text items so as to quickly modify the content in the subtitle text item without interfering with other subtitle text items. In this way, the video time periods bound to respective subtitle text items cannot be confused.

In some application scenarios, the text control may be a text box.

It should be noted that, the text box serves as the text control, so that subtitles are edited based on the existing text editing function of the text box. Therefore, development difficulty can be reduced and development efficiency can be improved. In addition, since the user is relatively familiar with the text box, the operation difficulty for the user is reduced, and thus the efficiency in editing subtitles by the user is improved.

In some embodiments, the method further includes: based on the splitting operation, generating a new text control and binding the newly generated text control to the newly generated subtitle text item.

For example, one subtitle text item is split into two subtitle text items. The first subtitle text item obtained from the splitting may be bound to the original text control. The second subtitle text item obtained from the splitting may be bound to the newly generated text control.

In some embodiments, the method further includes: deleting a text control bound to the merged subtitle text item based on the merging operation.

In some application scenarios, a new text control is generated for the newly generated subtitle text item after merging. The newly generated subtitle text item after merging is displayed in the new text control. Therefore, the probability of confusion of the text control is reduced by newly generating a text control. That is, in the case of retaining a text control and deleting another text control, an error may occur due to the various operations.

In some application scenarios, only one of the text controls bound to subtitle text items before merging remains, and the subtitle text item generated after the merging is displayed in the text control. In this way, it is unnecessary to spend computational effort to newly generate a text control, thereby increasing the speed at which the text item after merging is displayed.

In some embodiments, the method may further include: displaying a video frame corresponding to the updated subtitle text item based on the subtitle editing operation.

Here, a text editing operation or a unit editing operation may be performed on the subtitle text item. After the user operates on the subtitle text item, the updated subtitle text item is displayed in the subtitle editing area. In addition, the execution subject quickly updates the subtitle text of the updated subtitle text item to the video frame displayed in the video playing area.

Therefore, the user can timely preview the display effects of a video frame after subtitles corresponding to the video frame is updated, which is convenient for the user to make modifications based on the preview effects, thereby improving the overall efficiency in the user in editing the subtitles.

Figure 6:
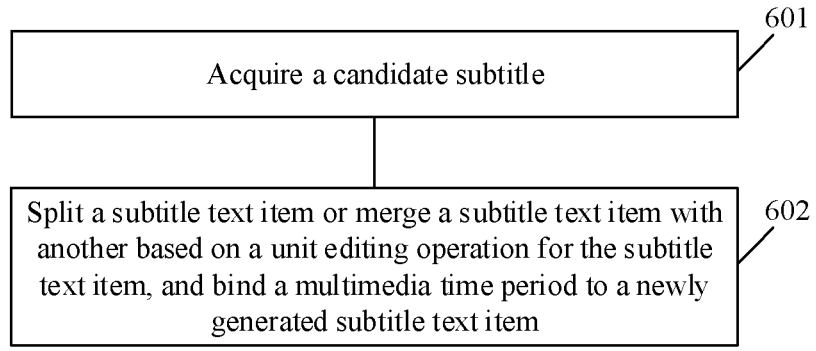
FIG. 6 is a flowchart illustrating a method for editing subtitles according to another embodiment of the present disclosure.

Reference is made to FIG. 6, which is a flowchart illustrating a method for editing subtitles according to another embodiment of the present disclosure. As shown in FIG. 6, the method for editing subtitles includes the following steps 601 to 602.

Step 601, a candidate subtitle is acquired.

Here, the candidate subtitle includes at least one subtitle text item. The subtitle text item is bound to a video time period. The video time period bound to the subtitle text item is for linking the subtitle and the video.

In step 602, based on a unit editing operation for the subtitle text item, the subtitle text item is split or merged with another, and a video time period is bound to the newly generated subtitle text item.

It should be noted that, relevant implementation details and technical effects of the embodiment shown in FIG. 6 may refer to the descriptions in other parts of the present disclosure, and thus are not described here.

It should be noted that the subtitle text item is bound to the video time period. When splitting a subtitle text item and merging process of subtitle text items, the execution subject can automatically bind a video time period to the newly generated subtitle text item.

Therefore, the process of manually adjusting a video time period for a subtitle is unnecessary, so that the difficulty in editing subtitles is reduced, and the efficiency in editing subtitles is improved.

In some embodiments, the binding a video time period to the newly generated subtitle text item includes: binding the video time period to the newly generated subtitle text item based on the video time period bound to the subtitle text item targeted by the splitting operation or the merging operation.

In some embodiments, the unit editing operation includes a splitting operation. The splitting a subtitle text item or merging a subtitle text item with another based on the unit editing operation for the subtitle text item, and binding a video time period to a newly generated subtitle text item includes: in response to the splitting operation, dividing a video time period bound to the subtitle text item before splitting based on a proportion of each subtitle text item obtained by splitting in the subtitle text item before splitting; and binding video time periods obtained by division to subtitle text items obtained by splitting, respectively.

In some embodiments, the unit editing operation includes a merging operation. The splitting a subtitle text item or merging the subtitle text item with another based on the unit editing operation for the subtitle text item, and binding a video time period to a newly generated subtitle text item includes: in response to the merging operation, merging at least two subtitle text items targeted by the merging operation, and merging video time periods respectively bound to the at least two subtitle text items.

Here, the subtitle editing operation may include a text editing operation for subtitle text and a unit editing operation for the subtitle text item. The editing operation for the subtitle text item may include modifying a relationship between subtitle text items, such as splitting a subtitle text item or merging subtitle text items.

It should be noted that, the candidate subtitles displayed in the subtitle editing area are updated based on the subtitle editing operation, so that the effect after editing can be displayed in time when the user edits the subtitle, which is convenient for the user to determine whether the editing is correct. Therefore, the efficiency in editing subtitles by the user can be improved.

In some embodiments, the subtitle editing operation includes a text editing operation. The method further includes: updating subtitle text in the subtitle editing area in response to a text editing operation for the subtitle text.

Here, the editing in the text editing operation may include, but is not limited to, addition, deletion, modification, and the like.

In some application scenarios, the user adds words to the candidate subtitle.

In some application scenarios, the user deletes words from the candidate subtitle.

In some application scenarios, the user modifies the words in the candidate subtitle.

In some application scenarios, the subtitle editing area may be understood as a text box when the user performs text editing operations in the subtitle editing area. It should be understood that operations that may be performed in a general text box may also be performed in the subtitle editing area.

It should be noted that, through the text editing operation, the user can modify the text of the candidate subtitles in time, thereby improving the accuracy of the subtitles corresponding to the target video. In some application scenarios, the candidate subtitles are obtained through speech recognition. Through the text editing operation, the user can correct the results obtained by speech recognition, thereby improving the accuracy of the subtitles corresponding to the target video.

In some embodiments, the subtitle editing operation includes a unit editing operation.

In some embodiments, the method further includes: splitting a subtitle text item or merging a subtitle text item with another based on the unit editing operation for the subtitle text item, and binding a video time period to a newly generated subtitle text item.

Here, one subtitle text item may be split into at least two subtitle text items.

Here, at least two subtitle text items may be merged into one subtitle text item.

Here, a subtitle text item may be split or subtitle text items may be merged based on the unit editing operation in units of subtitle text items.

It should be noted that the subtitle text item is bound to the video time period. In the process of splitting a subtitle text item or merging subtitle text items, the execution subject can automatically bind the video time period to the newly generated subtitle text item. Therefore, it is unnecessary to manually adjust the video time period for subtitles, thereby reducing the difficulty in editing subtitles and improving the efficiency in editing subtitles. In addition, the splitting or merging of subtitle text items can effectively make up for the disadvantages of speech recognition in sentence segmentation and improve the overall accuracy of the candidate subtitles.

In some embodiments, the unit editing operation may include a splitting operation.

Here, the splitting operation is for splitting at least two subtitle text items.

Here, the implementation of the splitting operation may be set according to the actual application scenario, and is not limited herein.

For example, the splitting operation may include segmenting a subtitle text item.

In some application scenarios, the execution subject splits a subtitle text item into at least two subtitle text items in response to a splitting operation on the subtitle text item. The at least two subtitle text items are displayed asynchronously.

In some embodiments, the splitting a subtitle text item or merging subtitle text items based on the unit editing operation for the subtitle text item includes: in response to the splitting operation, dividing a video time period bound to the subtitle text item before splitting based on a proportion of each subtitle text item obtained by splitting in the subtitle text item before splitting; and binding video time periods obtained by division to subtitle text items obtained by splitting, respectively.

It should be noted that, in response to the splitting operation, the video time period bound to the subtitle text item before splitting is divided based on the subtitle text item obtained by splitting. Therefore, the speed of binding the video time period to the newly generated subtitle text item can be improved under the condition that the video time periods respectively bound to the split subtitle text items match the audio.

In some embodiments, the proportion of the subtitle text item obtained by splitting in the subtitle text item before the splitting includes: a ratio of the number of words in the subtitle text item obtained by splitting to the total number of words in the subtitle text item before splitting.

It should be noted that the proportion of a time period is calculated based on the proportion of words, so that the proportion can be quickly determined and splitting is performed, thereby improving the splitting speed.

In some embodiments, the proportion of the subtitle text item obtained by splitting in the subtitle text item before the splitting includes: a ratio of the audio duration corresponding to the subtitle text item obtained by splitting to the total audio duration corresponding to the subtitle text item before splitting.

It should be noted that the calculation of the proportion based on the audio duration can fully take into account differences in speech pauses in the actual scene as well as the length and short sounds of different words. Therefore, the accuracy of splitting the video time period for splitting the subtitle text item is improved, thereby improving the degree of synchronization between the video and the subtitles.

In some embodiments, the unit editing operation includes a merging operation.

Here, the merging operation is for merging at least two subtitle text items.

Here, the specific implementation of the merging operation may be set according to the actual application scenarios, and thus is not limited herein.

In some embodiments, the splitting a subtitle text item or merging subtitle text items based on the unit editing operation for the subtitle text item includes: in response to a merging operation, merging at least two subtitle text items targeted by the merging operation, and merging video time periods respectively bound to the at least two subtitle text items.

For example, the merging operation may include deleting division of two subtitle text items.

In some application scenarios, in response to a merging operation for the subtitle text item, the execution subject merges at least two subtitle text items to generate a new subtitle text item. The generated new subtitle text item is played within the video time period to which the new subtitle text item is bound.

It should be noted that, in response to the merging operation, the at least two subtitle text items targeted by the merging operation are merged, and the newly generated subtitle text item is automatically bound to the video time period, thereby reducing the overall time spent on editing the candidate subtitles, that is, improving the efficiency in editing subtitles.

In some embodiments, subtitle text in a single subtitle text item is stored in the same storage unit, and different subtitle text items are stored in individual storage units.

In some application scenarios, the storage unit may be a physical storage location or a unit under a preset data structure.

For example, the storage unit may be an array. That is, subtitle text in a single subtitle text item may be stored in the same array, and different subtitle text items may be stored in different arrays.

It should be noted that different subtitle text items are stored in separate storage units so as to distinguish the subtitle text items, which is convenient to set respective self-attributes (e.g. video time period, text controls, etc.) for the subtitle text items.

It should be noted that the subtitle text item is stored in the data format of an array, so that the characters in the array can be quickly modified, thereby reducing the storage space occupied and improving the speed of the subtitle editing.

In some application scenarios, the at least two subtitle text items generated based on the splitting operation are stored in different storage units.

Here, the at least two subtitle text items generated after splitting are stored in different storage units, so that the self-attribute of the newly generated subtitle text item can be effectively set. Therefore, a subtitle can be quickly separated in practice, thereby matching the subtitle and the video frame.

In some application scenarios, the subtitle text item generated based on the merging operation is stored in the same storage unit.

Here, the subtitle text item generated after the merging operation is stored in the same storage unit, so that the self-attribute of the newly generated subtitle text item can be effectively set. Therefore, subtitles can be quickly merged in practice, thereby matching the subtitle and the video frame.

In some embodiments, the subtitle editing area includes a text control bound to the subtitle text item.

In some application scenarios, the subtitle editing area includes at least two subtitle editing sub-areas. The subtitle editing sub-area is for displaying one subtitle. The subtitle editing sub-area is bound to the subtitle text item. A size of the subtitle sub-area adapts to the number of words in the subtitle text item.

In some application scenarios, the subtitle editing sub-area may be understood as a text control. The position at which the text control is arranged adapts to the playing progress of the video. Visually, the subtitle text item may move in the subtitle editing area.

It should be understood that different text controls visually correspond to different text paragraphs. That is, different paragraphs visually correspond to different text controls.

Here, the text control is for displaying subtitle text in the subtitle text item to which the text control is bound.

It should be noted that subtitle text items are displayed in their individual text controls. Therefore, in the process of editing a subtitle text item, the user is prompted to distinguish subtitle text items so as to quickly modify the content in the subtitle text item without interfering with other subtitle text items. In this way, the video time periods bound to respective subtitle text items cannot be confused.

In some application scenarios, the text control may be a text box.

It should be noted that, the text box serves as the text control, so that subtitles are edited based on the existing text editing function of the text box. Therefore, development difficulty can be reduced and development efficiency can be improved. In addition, since the user is relatively familiar with the text box, the operation difficulty for the user is reduced, and thus the efficiency in editing subtitles by the user is improved.

In some embodiments, the method further includes: based on the splitting operation, generating a new text control and binding the newly generated text control to the newly generated subtitle text item.

For example, one subtitle text item is split into two subtitle text items. The first subtitle text item obtained from the splitting may be bound to the original text control. The second subtitle text item obtained from the splitting may be bound to the newly generated text control.

In some embodiments, the method further includes: deleting a text control bound to the merged subtitle text item based on the merging operation.

In some application scenarios, a new text control is generated for the newly generated subtitle text item after merging. The newly generated subtitle text item after merging is displayed in the new text control. Therefore, the probability of confusion of the text control is reduced by newly generating a text control. That is, in the case of retaining a text control and deleting another text control, an error may occur due to the various operations.

In some application scenarios, only one of the text controls bound to subtitle text items before merging remains, and the subtitle text item generated after the merging is displayed in the text control. In this way, it is unnecessary to spend computational effort to newly generate a text control, thereby increasing the speed at which the text item after merging is displayed.

In some embodiments, the method may further include: displaying a video frame corresponding to the updated subtitle text item based on the subtitle editing operation.

Here, a text editing operation or a unit editing operation may be performed on the subtitle text item. After the user operates on the subtitle text item, the updated subtitle text item is displayed in the subtitle editing area. In addition, the execution subject quickly updates the subtitle text of the updated subtitle text item to the video frame displayed in the video playing area.

Therefore, the user can timely preview the display effects of a video frame after subtitles corresponding to the video frame is updated, which is convenient for the user to make modifications based on the preview effects, thereby improving the overall efficiency in the user in editing the subtitles.

Figure 7:
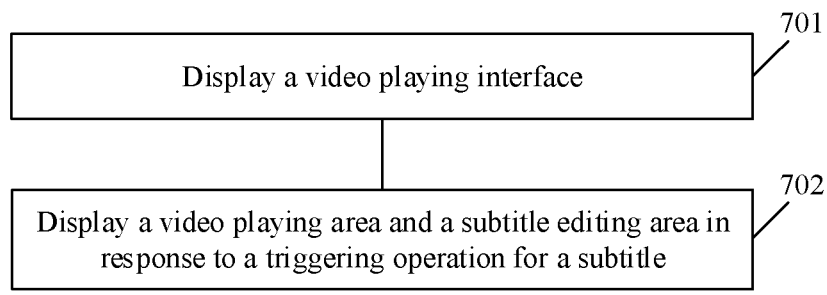
FIG. 7 is a flowchart illustrating a method for editing subtitles according to another embodiment of the present disclosure.

Reference is made to FIG. 7, which is a flowchart illustrating a method for editing subtitles according to another embodiment of the present disclosure. As shown in FIG. 7, the method for editing subtitles includes the following steps 701 to 702.

In step 701, a video playing interface is displayed.

Here, the video playing interface is for playing a video and displaying a subtitle corresponding to a video frame.

In step 702, in response to a triggering operation for the subtitle, a video playing area and a subtitle editing area are displayed.

Here, the subtitle editing area is for editing the subtitle, and the video playing area is for playing a target video.

It should be noted that the relevant implementation details and technical effects of the embodiment shown in FIG. 7 may refer to the descriptions in other parts of the present disclosure, and thus are not described here.

In some embodiments, the displaying the video playing area and the subtitle editing area in response to the triggering operation for the subtitle includes: in response to the triggering operation for the subtitle, reducing a size of the video playing area in the video playing interface, playing the video in the shrank video playing area, and displaying the subtitle editing area.

Here, the video is played in the shrank video playing area, so that the interface occupied for playing the video is reduced, which facilitates the display of the subtitle editing area, thereby improving the utilization of the interface and improving the efficiency in editing the subtitle.

In some embodiments, the subtitle editing area displays at least two subtitle text items.

In some scenarios, the subtitle text item is bound to a video time period. In the video time period bound to the subtitle text item, the audio indicated by the subtitle text item is played synchronously with the video frame displayed in the video playing area.

That is, the candidate subtitle may include one or at least two subtitle text items. The subtitle text item may be understood as a measurement unit of subtitle display. Briefly, a subtitle text item may be understood as a subtitle.

It should be noted that the at least two subtitle text items may be displayed in the subtitle editing area, so that the user can edit the subtitle text items in batches, thereby improving the operation efficiency.

In some embodiments, the method further includes: displaying, in a free browsing mode, the subtitle in the subtitle editing area in response to a first triggering operation in the subtitle editing area.

For example, the subtitle browsing operation is for triggering the subtitle (or subtitle text item) displayed in the free browsing mode in the subtitle editing area. The specific implementation of the subtitle browsing operation may depend on the actual application scenarios, and is not limited herein.

For example, the subtitle browsing operation may be a page turning operation, or a swiping operation in the subtitle editing area.

Here, in the free browsing mode, the user browses the subtitles in the subtitle editing area, and no subtitle text item is selected. The free browsing mode may be compared to a display mode in which the mouse wheel is scrolled in the document and the document is displayed according to the user operation.

It should be noted that, the user freely browses the subtitle text in the subtitle editing area while playing the target video, which helps the user to view the part of the candidate subtitles that is not displayed. In this way, the subtitle editing area can be updated, in a relatively fixed size, timely according to the user operation, which improves the efficiency in displaying information, thereby facilitating viewing by the user and improving the efficiency in editing subtitles.

In some embodiments, the method further includes: selecting, in response to a second triggering operation in the subtitle editing area, a subtitle text item in the subtitle editing area.

In some application scenarios, the cursor is placed in the area displaying the subtitle in order to determine the subtitle to be edited in the subtitle editing area. Therefore, the user unnecessarily spends time searching for the subtitle to be edited, thereby improving the efficiency in editing subtitles.

In some application scenarios, the response to a triggering operation for the subtitle includes: determining a touchpoint position of the triggering operation, and determining that the triggering operation for the subtitles is successfully detected when the touchpoint position is within an area displaying the subtitle.

Alternatively, an editing control associated with the subtitles may be provided. Triggering the editing control by the user may serve as the triggering operation for the subtitle.

Figure 8:
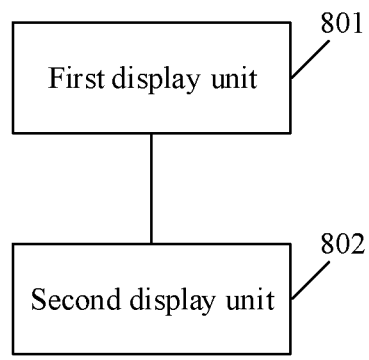
FIG. 8 is a schematic structural diagram illustrating an apparatus for editing subtitles according to an embodiment of the present disclosure.

Further, referring to FIG. 8, an apparatus for editing subtitles is provided according to an embodiment of the present disclosure, as an implementation of the method shown in the above drawings. This apparatus embodiment corresponds to the method embodiment shown in FIG. 1. The apparatus may be applied to various electronic devices. The apparatus includes units for performing corresponding steps or operations. The units may be implemented in software, hardware or a combination thereof.

As shown in FIG. 8, the apparatus for editing subtitles in this embodiment includes: a first display unit 801 and a second display unit 802. The first display unit is configured to display a video playing area and a subtitle editing area. The video playing area is for playing a target video. The subtitle editing area is for editing a candidate subtitle corresponding to the target video. The second display unit is configured to link a video frame currently displayed in the video playing area with a subtitle displayed in the subtitle editing area.

In this embodiment, processing performed by and the technical effects brought about by the first display unit 801 and the seconding display unit 802 of the apparatus for editing subtitles can refer to steps 101 and 102 in the embodiment shown in FIG. 1, respectively, and thus are not described in detail herein.

In some embodiments, the video frame currently displayed in the video playing area is linked with the subtitle displayed in the subtitle editing area as follows. In a predefined progress indication, a subtitle in the subtitle editing area corresponding to the video frame currently played is indicated in the video playing area.

In some embodiments, the video frame currently displayed in the video playing area is linked with the subtitle displayed in the subtitle editing area as follows. In response to a selection operation for a subtitle in the subtitle editing area, a video frame corresponding to the selected subtitle is displayed in the video playing area.

In some embodiments, the apparatus is further configured to: play audio corresponding to the video frame currently displayed in the video playing area.

In some embodiments, the apparatus is further configured to: play the target video in the video playing interface, and display the subtitle editing area in response to a predefined subtitle editing initiation operation.

In some embodiments, the subtitle editing initiating operation includes a triggering operation for the subtitle displayed in the video playing interface.

In some embodiments, the apparatus is further configured to determine the subtitle triggered in the video playing interface as a subtitle to be edited in the subtitle editing area.

In some embodiments, the subtitle editing initiation operation includes a triggering operation on a preset subtitle editing initiation control.

In some embodiments, the apparatus is further configured to: display, in response to a subtitle browsing operation for the subtitle editing area, the subtitle in the subtitle editing area in a free browsing mode while playing the target video.

In some embodiments, at least two subtitle text items of the candidate subtitle are displayed in the subtitle editing area. The subtitle text item is bound to the video time period. In the video time period bound to the subtitle text item, the audio indicated by the subtitle text item is played synchronously with the video frame displayed in the video playing area.

In some embodiments, the candidate subtitle is obtained based on speech recognition on the audio corresponding to the target video. The subtitle text item obtained by recognizing the audio in the time period of the target video is bound to the time period of the target video.

In some embodiments, the apparatus is further configured to: enable, in response to determination that the target video is paused, a function of the subtitle editing area responding to the subtitle editing operation.

In some embodiments, the target video may be paused in response to a selection operation for the subtitle text item in the subtitle editing area.

In some embodiments, the target video may be paused in response to a triggering operation for the subtitle text item in the subtitle editing area.

In some embodiments, the apparatus is further configured to: update the candidate subtitle displayed in the subtitle editing area based on the subtitle editing operation in the subtitle editing area.

In some embodiments, the subtitle editing operation may include a text editing operation. The apparatus is further configured to: in response to a text editing operation on the subtitle text, update subtitle text in the subtitle editing area and maintain the time period bound to a subtitle text item targeted by the text editing operation unchanged.

In some embodiments, the subtitle editing operation includes a unit editing operation. The apparatus is further configured to: split a subtitle text item or merge a subtitle text item with another based on the unit editing operation for the subtitle text item, and bind a video time period to a newly generated subtitle text item.

In some embodiments, the unit editing operation includes a splitting operation. The splitting a subtitle text item or merging a subtitle text item with another based on the unit editing operation for the subtitle text item, and binding a video time period to a newly generated subtitle text item includes: in response to the splitting operation, dividing a video time period bound to the subtitle text item before splitting based on a proportion of each subtitle text item obtained by splitting in the subtitle text item before splitting; and binding video time periods obtained by division to subtitle text items obtained by splitting, respectively.

In some embodiments, the proportion of the subtitle text item obtained by splitting in the subtitle text item before the splitting includes at least one of: a ratio of the number of words in the subtitle text item obtained by splitting to the total number of words in the subtitle text item before splitting; and a ratio of the audio duration corresponding to the subtitle text item obtained by splitting to the total audio duration corresponding to the subtitle text item before splitting.

In some embodiments, the unit editing operation includes a merging operation. The splitting a subtitle text item or merging a subtitle text item with another based on the unit editing operation for the subtitle text item, and binding a video time period to a newly generated subtitle text item includes: in response to the merging operation, merging at least two subtitle text items targeted by the merging operation, and merging video time periods respectively bound to the at least two subtitle text items.

In some embodiments, subtitle text in a single subtitle text item is stored in the same storage unit, and different subtitle text items are stored in individual storage units.

In some embodiments, a self-attribute is set for the storage unit in which the single subtitle text item is stored. Here, the self-attribute is for indicating a self-characteristic of the subtitle text item.

In some embodiments, the at least two subtitle text items generated based on the splitting operation are stored in different storage units. The subtitle text item generated based on the merging operation is stored in the same storage unit.

In some embodiments, the subtitle editing area includes a text control bound to a subtitle text item. The text control is for displaying subtitle text in the subtitle text item.

In some embodiments, the apparatus is further configured to: generate a new text control and bind the new text control to the newly generated subtitle text item based on the splitting operation; and/or delete a text control bound to the merged subtitle text item based on the merging operation.

In some embodiments, the apparatus is further configured to: display the video frame corresponding to the updated subtitle text item in the video playing area.

Figure 9:
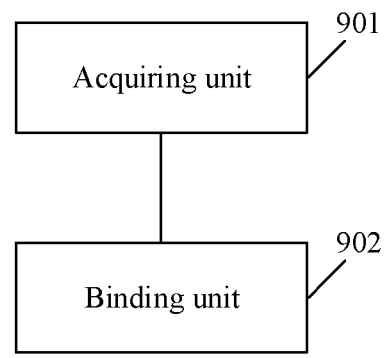
FIG. 9 is a schematic structural diagram illustrating an apparatus for editing subtitles according to an embodiment of the present disclosure.

Further, referring to FIG. 9, an apparatus for editing subtitles is provided according to an embodiment of the present disclosure, as an implementation of the method shown in the above drawings. This apparatus embodiment corresponds to the method embodiment shown in FIG. 1. The apparatus may be applied to various electronic devices. The apparatus includes units for performing corresponding steps or operations. The units may be implemented in software, hardware or a combination thereof.

As shown in FIG. 9, the apparatus for editing subtitles in this embodiment includes: an acquiring unit 901 and a binding unit 902. The acquiring unit is configured to acquire a candidate subtitle. The candidate subtitle includes at least one subtitle text item. The subtitle text item is bound to a video time period. The video time period bound to the subtitle text item is for linking a subtitle with a video. The binding unit is configured to split a subtitle text item or merge a subtitle text item with another based on a unit editing operation for the subtitle text item, and bind a video time period to a newly generated subtitle text item.

In this embodiment, the processing performed by and the technical effects brought about by the acquiring unit 901 and the binding unit 902 of the apparatus for editing subtitles can refer to the relevant descriptions of steps 601 and 602 in the embodiment shown in FIG. 6, respectively, and thus are not described in detail herein.

In some embodiments, the binding a video time period to the newly generated subtitle text item includes: binding the video time period to the newly generated subtitle text item based on the video time period bound to the subtitle text item targeted by the splitting operation or the merging operation.

In some embodiments, the unit editing operation includes a splitting operation. The splitting a subtitle text item or merging the subtitle text item with another based on the unit editing operation for the subtitle text item, and binding a video time period to a newly generated subtitle text item includes: in response to the splitting operation, dividing a video time period bound to the subtitle text item before splitting based on a proportion of each subtitle text item obtained by splitting in the subtitle text item before splitting; and binding video time periods obtained by division to subtitle text items obtained by splitting, respectively.

In some embodiments, the unit editing operation includes a merging operation. The splitting a subtitle text item or merging a subtitle text item with another based on the unit editing operation for the subtitle text item, and binding a video time period to a newly generated subtitle text item includes: in response to the merging operation, merging at least two subtitle text items targeted by the merging operation, and merging video time periods respectively bound to the at least two subtitle text items.

Figure 10:
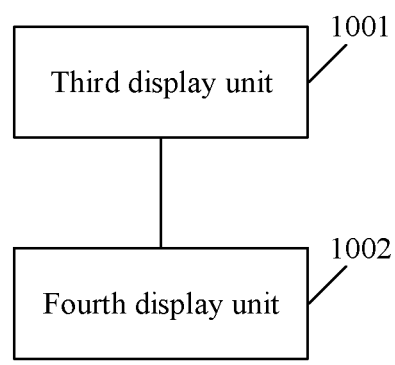
FIG. 10 is a schematic structural diagram illustrating an apparatus for editing subtitles according to an embodiment of the present disclosure.

Further, referring to FIG. 10, an apparatus for editing subtitles is provided according to an embodiment of the present disclosure, as an implementation of the method shown in the above drawings. This apparatus embodiment corresponds to the method embodiment shown in FIG. 1. The apparatus may be applied to various electronic devices. The apparatus includes units for performing corresponding steps or operations. The units may be implemented in software, hardware or a combination thereof.

As shown in FIG. 10, the apparatus for editing subtitles in this embodiment includes a third display unit 1001 and a fourth display unit 1002. The third display unit is configured to display a video playing interface. The video playing interface is for playing a video and display a subtitle corresponding to a video frame. The fourth display unit is configured to display a video playing area and a subtitle editing area in response to a triggering operation for the subtitle. The subtitle editing area is for editing the subtitle. The video playing area is for playing a target video.

In this embodiment, the processing performed by and the technical effects brought about by the third display unit 1001 and the fourth display unit 100 of the apparatus for editing subtitles can refer to the relevant description of steps 701 and 702 in the embodiment shown in FIG. 7, respectively, and thus are not described in detail herein.

In some embodiments, the displaying the video playing area and the subtitle editing area in response to the triggering operation for the subtitle includes: reducing a size of the video playing area in the video playing interface in response to the triggering operation for the subtitle, playing the video in the shrank video playing area, and displaying the subtitle editing area.

In some embodiments, the subtitle editing area displays at least two subtitle text items.

In some embodiments, the apparatus is further configured to: display, in a free browsing mode, the subtitle in the subtitle editing area in response to a first triggering operation in the subtitle editing area.

In some embodiments, the apparatus is further configured to: select, in response to a second triggering operation in the subtitle editing area, a subtitle text item in the subtitle editing area.

In some embodiments, the response to a triggering operation for the subtitle includes: determining a touchpoint position of the triggering operation, and determining that the triggering operation for the subtitles is successfully detected when the touchpoint position is within an area displaying the subtitle.

Figure 11:
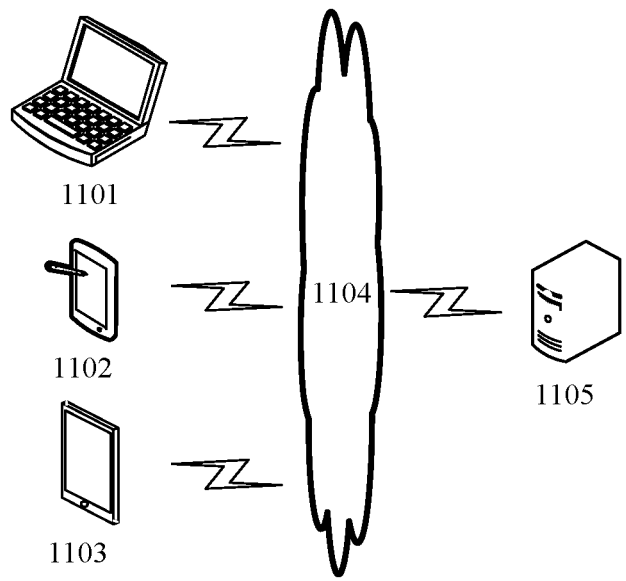
FIG. 11 illustrates a system architecture to which the method for editing subtitles according to the embodiments of the present disclosure may be applied.

Reference is made to FIG. 11, which illustrates a system architecture to which the method for editing subtitles according to the embodiments of the present disclosure may be applied.

As shown in FIG. 11, the system architecture may include terminal devices 1101, 1102, and 1103, a network 1104, and a server 1105. The network 1104 is a medium providing a communication link between the terminal devices 1101, 1102, 1103 and the server 1105. The network 1104 may include various connection types, such as wired or wireless communication links, or fiber optic cables.

The terminal devices 1101, 1102, 1103 may interact with the server 1105 through the network 1104 so as to receive or send messages and the like. Various client applications, such as web browser applications, search applications, and news information applications, may be installed on the terminal devices 1101, 1102 and 1103. The client applications in the terminal devices 1101, 1102, and 1103 may receive a user instruction, and implement corresponding functions according to the user instruction, for example, adding information to the existing information according to the user instruction.

The terminal devices 1101, 1102, and 1103 may be hardware or software. In a case of hardware, the terminal devices 1101, 1102, and 1103 may be various electronic devices with a display screen and supporting web browsing, including but not limited to smartphones, tablets, e-book readers, MP3 players (Moving Picture Experts Group Audio Layer III), MP4 (Moving Picture Experts Group Audio Layer IV) players, laptops and desktop computers. In a case of software, the terminal devices 1101, 1102, and 1103 may be installed in the electronic devices listed above. The terminal devices 1101, 1102, and 1103 may be implemented as multiple software or software modules (e.g., software or software modules for providing distributed services), or may be implemented as a single software or software module. There is no specific limitation herein.

The server 1105 may be a server that provides various services, for example, receiving an information acquisition request sent by the terminal devices 1101, 1102, and 1103, acquiring display information corresponding to the information acquisition request in various ways, and sending relevant data of the display information to the terminal devices 1101, 1102, and 1103.

It should be noted that the method for editing subtitles according to the embodiments of the present disclosure may be performed by a terminal device. Accordingly, the apparatus for editing subtitles may be provided in the terminal devices 1101, 1102, and 1103. In addition, the method for editing subtitles according to the embodiments of the present disclosure may also be performed by the server 1105. Accordingly, the apparatus for editing subtitles may be provided in the server 1105.

It should be understood that the numbers of terminal devices, networks and servers in FIG. 11 are merely illustrative. The number of terminal devices, the number of networks and the number of servers may be set as needed.

Figure 12:
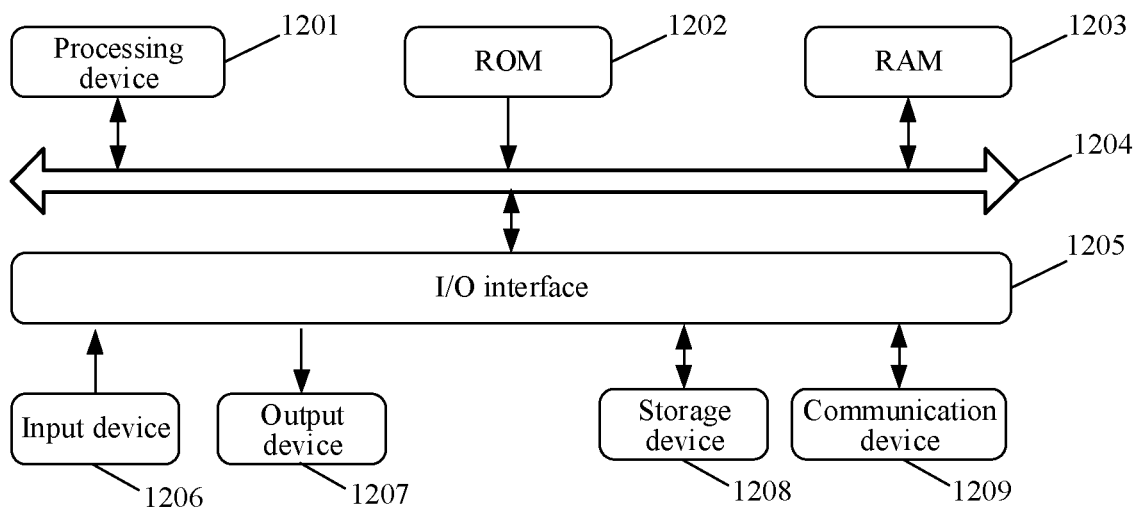
FIG. 12 is a schematic diagram illustrating a basic structure of an electronic device according to an embodiment of the present disclosure.

Reference is made to FIG. 12 next, which is a schematic structural diagram illustrating an electronic device (e.g., a terminal device or a server in FIG. 11) suitable for implementing the embodiments of the present disclosure. The terminal device in this embodiment of the present disclosure may include but is not limited to a mobile terminal such as a mobile phone, a notebook computer, a digital broadcast receiver, a PDA (Personal Digital Assistant), a PAD (Tablet Computer), a PMP (Portable Multimedia Player), an in-vehicle terminal (e.g., in-vehicle navigation terminal) and the like, as well as a stationary terminal such as a digital TV, a desktop computer, and the like.

As shown in FIG. 12, the electronic device may include a processing device (e.g., a central processing unit, a graphics processing unit, etc.) 1201. The processing device 1201 may perform various appropriate actions and processing according to a program stored in a read only memory (ROM) 1202 or a program loaded from a storage device 1208 into a random-access memory (RAM) 1203. In the RAM 1203, various programs and data necessary for the operation of the electronic device 1200 are also stored. The processing device 1201, the ROM 1202, and the RAM 1203 are connected to each other via a bus 1204. An input/output (I/O) interface 1205 is also connected to the bus 1204.

Generally, the following components may be connected to the I/O interface 1205: an input device 1206 including, for example, a touch screen, a touch pad, a keyboard, a mouse, a camera, a microphone, an accelerometer, and a gyroscope; an output device 1207 including, for example, a liquid crystal display (LCD), a speaker and a vibrator; a storage device 1208 including, for example, a tape and a hard disk; and a communication device 1209. The communication device 1209 may allow the electronic device 1200 to communicate wirelessly or by wire with other devices to exchange data. Although FIG. 11 shows the electronic device having various devices, it should be understood that not all of the illustrated devices are necessarily implemented or provided. Instead, more or fewer devices may be implemented or provided.

In particular, the processing described above with reference to the flowcharts may be implemented as computer software programs according to an embodiment of the present disclosure. For example, a computer program product is provided according to an embodiment of the present disclosure. The computer program product includes a computer program carried by a non-transitory computer readable medium. The computer program includes program code for performing the method shown in the flowchart. In such embodiment, the computer program may be downloaded and installed from the network via the communication device 1209, or from the storage device 1208, or from the ROM 1202. The computer program, when being executed by the processing device 1201, implements the functionalities defined in the method according to the embodiment of the present disclosure.

It should be noted that the computer readable medium according to the present disclosure may be a computer readable signal medium or a computer readable storage medium, or any combination of the above two. The computer readable storage medium may be, for example, but not limited to, an electrical, magnetic, optical, electromagnetic, infrared, or semiconductor system, apparatus or device, or a combination of any of the above. More specific examples of the computer readable storage medium may include, but are not limited to, an electrical connection with one or more wires, a portable computer disk, a hard disk, a random-access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above. According to the present disclosure, the computer readable storage medium may be any tangible medium that contains or stores a program. The program may be used by or in conjunction with an instruction execution system, apparatus or device. In the present disclosure, the computer readable signal medium may include a data signal propagated in baseband or as part of a carrier wave with computer readable program code embodied thereon. The data signal propagated in this manner may be in various forms, including but not limited to an electromagnetic signal, an optical signal, or any suitable combination of the foregoing. The computer readable signal medium may also be any computer readable medium other than the computer readable storage medium. The computer readable signal medium may transmit, propagate, or transport the program for use by or in connection with the instruction execution system, apparatus, or device. The program code embodied on the computer readable medium may be transmitted over any suitable medium including, but not limited to, an electrical wire, an optical fiber cable, RF (radio frequency), or any suitable combination of the foregoing.

In some embodiments, the client terminal and the server may perform communications based on any currently known or future developed network protocol such as HTTP (Hypertext Transfer Protocol), and may be interconnected with any form or medium of digital data communication (e.g., a communication network). Examples of the communication network include a local area network ("LAN"), a wide area network ("WAN"), an international network (e.g., the Internet), and a peer-to-peer network (e.g., the ad hoc peer-to-peer network), as well as any currently known or future developed networks.

The computer readable medium may be included in the electronic device, or may exist alone without being incorporated into the electronic device.

The computer readable medium carries one or more programs that, when being executed by the electronic device, cause the electronic device to: display a video playing area and a subtitle editing area, where the video playing area is for playing a target video, and the subtitle editing area is for editing a candidate subtitle corresponding to the target video; and link a video frame currently displayed in the video playing area with a subtitle displayed in the subtitle editing area.

The computer readable medium carries one or more programs that, when being executed by the electronic device, cause the electronic device to: acquire a candidate subtitle, where the candidate subtitle includes at least one subtitle text item, the subtitle text item is bound to a video time period, and the video time period bound to the subtitle text item is for linking a subtitle with a video; and split a subtitle text item or merge a subtitle text item with another based on a unit editing operation for the subtitle text item, and bind a video time period to a newly generated subtitle text item.

The computer readable medium carries one or more programs that, when being executed by the electronic device, cause the electronic device to: display a video playing interface, where the video playing interface is for playing a video and displaying a subtitle corresponding to a video frame; and display a video playing area and a subtitle editing area in response to a triggering operation for the subtitle. The subtitle editing area is for editing the subtitle, and the video playing area is for playing a target video.

The computer program code for performing operations according to the present disclosure may be written in one or more programming languages, or a combination thereof. Such programming languages include, but are not limited to, object-oriented programming languages, such as Java, Smalltalk, C++, and conventional procedural programming languages, such as the "C" language or similar programming languages. The program code may be executed entirely on a user computer, partly on a user computer, as a stand-alone software package, partly on a user computer and partly on a remote computer, or entirely on a remote computer or server. In the case of a remote computer, the remote computer may be connected to a user computer over any kind of network, including a local area network (LAN) or a wide area network (WAN), or may be connected to an external computer (e.g., over the Internet provided by an Internet service provider).

The flowcharts and block diagrams in the drawings illustrate the architecture, functionality, and operation of possible implementations of systems, methods and computer program products according to various embodiments of the present disclosure. In this regard, each block in the flowchart or block diagrams may represent a module, segment, or portion of code. The module, segment, or portion of code contains one or more executable instructions for implementing the specified logical functionalities. It should be noted that, in some alternative implementations, the functionalities noted in the blocks may be performed in an order different from the order noted in the drawings. For example, two blocks shown in succession may in fact be performed concurrently or in reverse, depending upon the functionalities involved. It should further be noted that each block in the block diagrams and/or flowcharts and combinations of blocks in the block diagrams and/or flowcharts may be implemented by special purpose hardware-based systems that perform specified functionalities or operations, or by combinations of special purpose hardware and computer instructions.

The units involved in the embodiments of the present disclosure may be implemented in software or hardware. The name of a unit does not, in any case, qualify the module or unit itself. For example, the first display unit may also be described as "a unit for displaying indication information of a target video".

The functionalities described herein above may be performed, at least in part, by one or more hardware logic components. For example, without limitation, illustrative hardware logic components that may be used include: Field Programmable Gate Array (FPGA), Application Specific Integrated Circuit (ASIC), Application Specific Standard Products (ASSP), Systems on Chip (SOC), Complex Programmable Logic Device (CPLD) and so on.

In the context of the present disclosure, a machine-readable medium may be a tangible medium that may contain or store a program for use by or in connection with the instruction execution system, apparatus or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination of the foregoing. More specific examples of the machine-readable storage medium may include: an electrical connection based on one or more wires, a portable computer disk, a hard disk, a random-access memory (RAM), a read only memory (ROM), an erasable programmable read only memory (EPROM or flash memory), a fiber optic cable, a portable compact disk read only memory (CD-ROM), an optical storage device, a magnetic storage device, or any suitable combination of the foregoing.

The above description merely shows preferred embodiments according to the present disclosure and an illustration of the technical principles employed. Those skilled in the art should understand that the scope of disclosure involved in the present disclosure should cover other technical solutions formed by any combination of the above technical features or their equivalents without departing from the above disclosed concept, for example, a technical solution formed by replacing the above features with technical features (but not limited to) having functions similar to that disclosed in the present disclosure, rather than being limited to the technical solutions formed by the specific combination of the above technical features.

Additionally, although operations are illustrated in a particular order, the operations should not be construed as being performed in the particular order shown or in a sequential order necessarily. Under certain circumstances, multitasking and parallel processing may be advantageous. Likewise, the several implementation-specific details discussed above should not be construed as limitations on the scope of the present disclosure. Some features that are described in the context of separate embodiments may also be implemented in combination in a single embodiment. Alternatively, various features that are described in the context of a single embodiment may also be implemented in multiple embodiments separately or in any suitable sub-combination.

Although the subject matter has been described in languages specific to structural features and/or logical acts of method, it should understand that the subject matter defined in the appended claims is unnecessarily limited to the specific features or acts described above. Instead, the features and acts described above are merely example forms of implementing the claims.

What is claimed is:

1. A method for editing subtitles, comprising:
    displaying an interface configured to play a target video and display subtitles corresponding to frames of the target video;
    in response to an operation performed on a subtitle being displayed on the interface, switching to display a video playing area and a subtitle editing area, wherein the subtitle is among the subtitles corresponding to the frames of the target video, wherein the video playing area is configured to play the target video, and wherein the subtitle editing area is configured to implement editing the subtitles corresponding to the frames of the target video;
    in response to detecting that the target video is paused in the video playing area, enabling an editing function in the subtitle editing area, wherein the editing function in the subtitle editing area comprises detecting editing operations and modifying the subtitles based on the editing operations;
    modifying at least one subtitle displayed in the subtitle editing area based on at least one-editing operation received via the subtitle editing area, wherein the at least one subtitle is among the subtitles corresponding to the frames of the target video, and wherein the modifying at least one subtitle comprises splitting a subtitle text item or merging the subtitle text item with another subtitle text item to generate at least one newly generated subtitle text item; and
    binding a time period of the target video to the at least one newly generated subtitle text item.

2. The method according to claim 1, wherein the linking a video frame currently displayed in the video playing area with a subtitle displayed in the subtitle editing area comprises: indicating, in a predefined progress indication and in the subtitle editing area, a subtitle corresponding to the video frame currently played in the video playing area; and/or
    wherein the linking a video frame currently displayed in the video playing area with a subtitle displayed in the subtitle editing area comprises: in response to a selection operation for a subtitle in the subtitle editing area, displaying a video frame corresponding to the selected subtitle in the video playing area; and/or
    the method further comprising: playing audio corresponding to the video frame currently displayed in the video playing area; and/or
    the method further comprising: playing the target video in a video playing interface, and displaying the subtitle editing area in response to a predefined subtitle editing initiation operation.

3. The method according to claim 2, wherein the subtitle editing initiation operation comprises:
    a triggering operation for a subtitle displayed in the video playing interface.

4. The method according to claim 3, further comprising:
    determining the subtitle triggered in the video playing interface as a subtitle to be edited in the subtitle editing area.

5. The method according to claim 2, wherein the subtitle editing initiation operation comprises:
    a triggering operation for a preset subtitle editing initiation control.

6. The method according to claim 1, further comprising: displaying, based on a subtitle browsing operation for the subtitle editing area, the subtitle in the subtitle editing area in a free browsing mode while playing the target video; and/or
    wherein the subtitle editing area is capable of displaying at least two subtitle text items of the candidate subtitle, and each of the two subtitle text items is bound to a video time period, wherein in the video time period, audio indicated by the subtitle text item is played synchronously with a video frame displayed in the video playing area; and/or
    wherein the candidate subtitle is obtained based on speech recognition on audio corresponding to the target video, and a subtitle text item obtained by recognizing a speech in a target video time period is bound to the target video time period; and/or
    the method further comprising: enabling, in response to determination that the target video is paused, a function of the subtitle editing area responding to the subtitle editing operation.

7. The method according to claim 6, wherein the target video is paused in response to a selection operation for a subtitle text item in the subtitle editing area; and/or
    wherein the target video is paused in response to a preset triggering operation for the video playing area.

8. The method according to claim 6, wherein the subtitle editing area comprises a text control bound to a subtitle text item, and the text control is for displaying subtitle text in the subtitle text item; and/or
    the method further comprising: displaying, in the video playing area, a video frame corresponding to an updated subtitle text item.

9. The method according to claim 8, wherein the method further comprises at least one of:
generating a new text control and binding the new text control to a newly generated subtitle text item based on a splitting operation; and
deleting a text control bound to a merged subtitle text item based on a merging operation.

10. The method according to claim 1, further comprising: updating the candidate subtitle displayed in the subtitle editing area based on a subtitle editing operation in the subtitle editing area.

11. The method according to claim 10, wherein the subtitle editing operation comprises a text editing operation, and the method further comprises: in response to the text editing operation on subtitle text, updating subtitle text in the subtitle editing area and maintaining a time period bound to a subtitle text item targeted by the text editing operation.

12. The method according to claim 1, wherein the unit editing operation comprises a splitting operation, and the splitting a subtitle text item or merging a subtitle text item with another based on the unit editing operation for the subtitle text item, and binding a video time period to a newly generated subtitle text item comprises: in response to the splitting operation, dividing a video time period bound to the subtitle text item before splitting based on a proportion of each subtitle text item obtained by splitting in the subtitle text item before splitting; and binding video time periods obtained by division to subtitle text items obtained by splitting, respectively; and/or
wherein the unit editing operation comprises a merging operation, and the splitting a subtitle text item or merging a subtitle text item with another based on the unit editing operation for the subtitle text item, and binding a video time period to a newly generated subtitle text item comprises: in response to the merging operation, merging at least two subtitle text items targeted by the merging operation, and merging video time periods respectively bound to the at least two subtitle text items.

13. The method according to claim 12, wherein the ratio of the subtitle text item obtained by splitting in the subtitle text item before splitting comprises at least one of:
a ratio of the number of words in the subtitle text item obtained by splitting to the total number of words in the subtitle text item before splitting; and
a ratio of an audio duration corresponding to the subtitle text item obtained by splitting to a total audio duration corresponding to the subtitle text item before splitting.

14. The method according to claim 1, wherein subtitle text in a single subtitle text item is stored in a same storage unit, and different subtitle text items are stored in individual storage units.

15. The method according to claim 14, wherein a self-attribute is set for the storage unit in which the single subtitle text item is stored, and the self-attribute is for indicating a self-characteristic of the subtitle text item; and/or
wherein at least two subtitle text items obtained based on a splitting operation are stored in different storage units; and a subtitle text item generated obtained based on a merging operation is stored in a same storage unit; and/or
the storage unit comprises an array; and/or a self-attribute of the storage unit comprises at least one of: a multimedia time period bound to the subtitle text item, a text control bound to the subtitle text item, and an editing triggering control bound to the subtitle text item; and/or
the method further comprising: maintaining a self-attribute of the subtitle text item unchanged when editing the subtitle text in the subtitle text item.

16. A method for editing subtitles, comprising:
displaying an interface configured to play a target video and display subtitles corresponding to frames of the target video;
in response to an operation performed on a subtitle being displayed on the interface, switching to display a video playing area and a subtitle editing area, wherein the subtitle is among the subtitles corresponding to the frames of the target video, wherein the video playing area is configured to play the target video, and wherein the subtitle editing area is configured to implement editing the subtitles corresponding to the frames of the target video;
in response to detecting that the target video is paused in the video playing area, enabling an editing function in the subtitle editing area, wherein the editing function in the subtitle editing area comprises detecting editing operations and modifying the subtitles based on the editing operations;
acquiring at least one subtitle displayed in the subtitle editing area, wherein the at least one subtitle comprises at least one subtitle text item, wherein the at least one subtitle is among the subtitles corresponding to the frames of the target video;
modifying the at least one subtitle by splitting the at least one subtitle text item or merging the at least one subtitle text item with another subtitle text item based on a unit editing operation received via the subtitle editing area to generate at least one newly generated subtitle text item; and
binding a multimedia time period to the newly generated subtitle text item.

17. The method according to claim 16, wherein the binding a multimedia time period to a newly generated subtitle text item comprises: binding the multimedia time period to the newly generated subtitle text item based on a multimedia time period bound to the subtitle text item targeted by the splitting operation or merging operation; and/or
wherein the multimedia time period comprises at least one of: a video time period and an audio time period; and/or
the method further comprising: maintaining the multimedia time period bound to the subtitle text item unchanged when editing subtitle text in the subtitle text item.

18. The method according to claim 17, wherein the unit editing operation comprises a splitting operation, and the splitting a subtitle text item or merging a subtitle text item with another based on a unit editing operation for the subtitle text item, and binding a multimedia time period to a newly generated subtitle text item comprises: in response to the splitting operation, dividing a multimedia time period bound to the subtitle text item before splitting based on a proportion of each subtitle text item obtained by splitting in the subtitle text item before splitting; and binding multimedia time periods obtained by division to subtitle text items obtained by splitting, respectively; and/or
wherein the unit editing operation comprises a merging operation, and the splitting a subtitle text item or merging a subtitle text item with another based on a unit editing operation for the subtitle text item, and binding a multimedia time period to a newly generated subtitle text item comprises: in response to the merging operation, merging at least two subtitle text items targeted by the merging operation, and merging multimedia time periods respectively bound to the at least two subtitle text items.

19. A method for editing subtitles, comprising:
displaying a video playing interface, wherein the video playing interface is configured to play a target video and display subtitles corresponding to frames of the target video;
displaying a video playing area and a subtitle editing area in response to a triggering operation performed on a subtitle being displayed on the video playing interface, wherein the subtitle is among the subtitles corresponding to the frames of the target video, wherein the subtitle editing area is configured to implement editing the subtitles, and the video playing area is configured to play the target video;
in response to detecting that the target video is paused in the video playing area, enabling an editing function in the subtitle editing area, wherein the editing function in the subtitle editing area comprises detecting editing operations and modifying the subtitles based on the editing operations;
modifying at least one subtitle displayed in the subtitle editing area based on at least one-editing operation received via the subtitle editing area, wherein the at least one subtitle is among the subtitles corresponding to the frames of the target video, and wherein the modifying at least one subtitle comprises splitting a subtitle text item or merging the subtitle text item with another subtitle text item to generate at least one newly generated subtitle text item; and
binding a time period of the target video to the at least one newly generated subtitle text item.

20. The method according to claim 19, wherein displaying a video playing area and a subtitle editing area in response to a triggering operation for the subtitle comprises: in response to the triggering operation for the subtitle, reducing a size of the video playing area in the video playing interface, playing the video in the shrank video playing area, and displaying the subtitle editing area; and/or
wherein the subtitle editing area is capable of displaying at least two subtitle text items; and/or
the method further comprising: displaying, in a free browsing mode, the subtitle in the subtitle editing area in response to a first triggering operation in the subtitle editing area; and/or
the method further comprising: selecting, in response to a second triggering operation in the subtitle editing area, a subtitle text item in the subtitle editing area; and/or
wherein the response to the triggering operation for the subtitle comprises: determining a touchpoint position of the triggering operation, and determining that the triggering operation for the subtitles is successfully detected when the touchpoint position is within an area displaying the subtitle.

\* \* \* \* \*